United States Patent
Shuma et al.

(10) Patent No.: US 10,929,359 B2
(45) Date of Patent: Feb. 23, 2021

(54) DYNAMICALLY REORGANIZING A DATASET USING ONLINE MIGRATION WHILE ALLOWING CONCURRENT USER ACCESS TO DATA IN THE DATASET

(71) Applicant: CA, Inc., Islandia, NY (US)

(72) Inventors: Kevin P. Shuma, Celina, TX (US); Joseph B. Lynn, Plano, TX (US); Kenneth W. Eaton, Terrell, TX (US)

(73) Assignee: CA, INC., New York, NY (US)

( * ) Notice: Subject to any disclaimer, the term of this patent is extended or adjusted under 35 U.S.C. 154(b) by 193 days.

(21) Appl. No.: 16/112,508

(22) Filed: Aug. 24, 2018

(65) Prior Publication Data

US 2020/0065392 A1    Feb. 27, 2020

(51) Int. Cl.
*G06F 16/21*    (2019.01)

(52) U.S. Cl.
CPC .................... *G06F 16/214* (2019.01)

(58) Field of Classification Search
CPC ................ G06F 3/0607; G06F 16/21
See application file for complete search history.

(56) References Cited

U.S. PATENT DOCUMENTS

| | | | |
|---|---|---|---|
| 6,253,300 B1* | 6/2001 | Lawrence | G06F 3/0611 711/112 |
| 9,710,186 B2 | 7/2017 | Shuma et al. | |
| 2005/0246385 A1* | 11/2005 | Nishino | G06F 16/2282 |
| 2011/0035359 A1* | 2/2011 | Bendakovsky | G06F 11/1458 707/640 |
| 2015/0370505 A1* | 12/2015 | Shuma | G06F 3/0604 711/165 |
| 2019/0354602 A1 | 11/2019 | Shuma et al. | |

OTHER PUBLICATIONS

U.S. Appl. No. 15/983,560, filed May 18, 2018, entitled Dynamically Changing the Architecture of a Dataset While Allowing Concurrent User Access to Data in the Dataset, Inventors Kevin P. Shuma et al. (72 pages).

* cited by examiner

*Primary Examiner* — Hau H Hoang
(74) *Attorney, Agent, or Firm* — Morgan, Lewis & Bockius LLP

(57) ABSTRACT

An embodiment includes initiating a migration of data rows in a source dataset in a source storage device to a target dataset in a target storage device. A block size defined for the target dataset equals a block size defined for the source dataset, and the migration is to be performed according to a native sequence of the data rows. The embodiment includes receiving, during the migration, a user request for access to a first data row in the source dataset, determining that the first data row was migrated to a first target block in the target dataset, and responding to the user request using the first data row in the first target block. In specific embodiments, a capacity of the target dataset is greater than a capacity of the source dataset. In other embodiments, a capacity of the target dataset is less than a capacity of the source dataset.

20 Claims, 24 Drawing Sheets

DYNAMICALLY REORGANIZING A DATASET USING ONLINE MIGRATION WHILE ALLOWING CONCURRENT USER ACCESS TO DATA IN THE DATASET

BACKGROUND

The present disclosure relates in general to the field of data storage, and more specifically, to dynamically reorganizing a dataset using online migration while allowing concurrent user access to data in the dataset.

Mass storage devices (MSDs) are used to store large quantities of data. A wide variety of entities utilize MSDs to enable continuous or near-continuous access to the data. Retailers, government agencies and services, educational institutions, transportation services, and health care organizations are among a few entities that may provide 'always on' access to their data by customers, employees, students, or other authorized users.

A database is one example of a data structure used to store large quantities of data as an organized collection of information. Typically, databases have a logical structure such that a user accessing the data in the database sees logical data columns arranged in logical data rows. A Database Administrator (DBA) can use available technology together with particular preferences, requirements, and/or needs to architect a database for a given entity. While data rows are typically stored in a database using a desired sequence (e.g., a native sequence), each data row addition and each data row deletion can impact the sequence of the data rows. Consequently, over time, a database can become increasingly out-of-sequence. For some database implementations, performing an offline reorganization of a dataset in native sequence may require significant downtime. In many scenarios, this downtime may not be acceptable to the application owner and end-users. In other scenarios, an online reorganization process that uses free space in the database may be available, but unusable due to lack of sufficient free space in the specified database.

BRIEF SUMMARY

According to one aspect of the present disclosure, a migration of data rows in a source dataset in a source storage device to a target dataset in a target storage device is initiated. A block size defined for the target dataset can be equal to a block size defined for the source dataset. The migration can be performed according to a native key sequence of the data rows. Buffers in memory are available to handle both source and target blocks during the migration. During the migration, a user request for access to a data row in the source dataset can be received. A determination can be made that the data row was migrated to a target block in the target dataset. The target block can be loaded from the target dataset into a buffer in memory if the target block is not already loaded in memory. A response to the user request can be made using the data row in the target block loaded into the buffer.

BRIEF DESCRIPTION OF THE DRAWINGS

Like reference numbers and designations in the various drawings indicate like elements.

DETAILED DESCRIPTION

Figure 1:
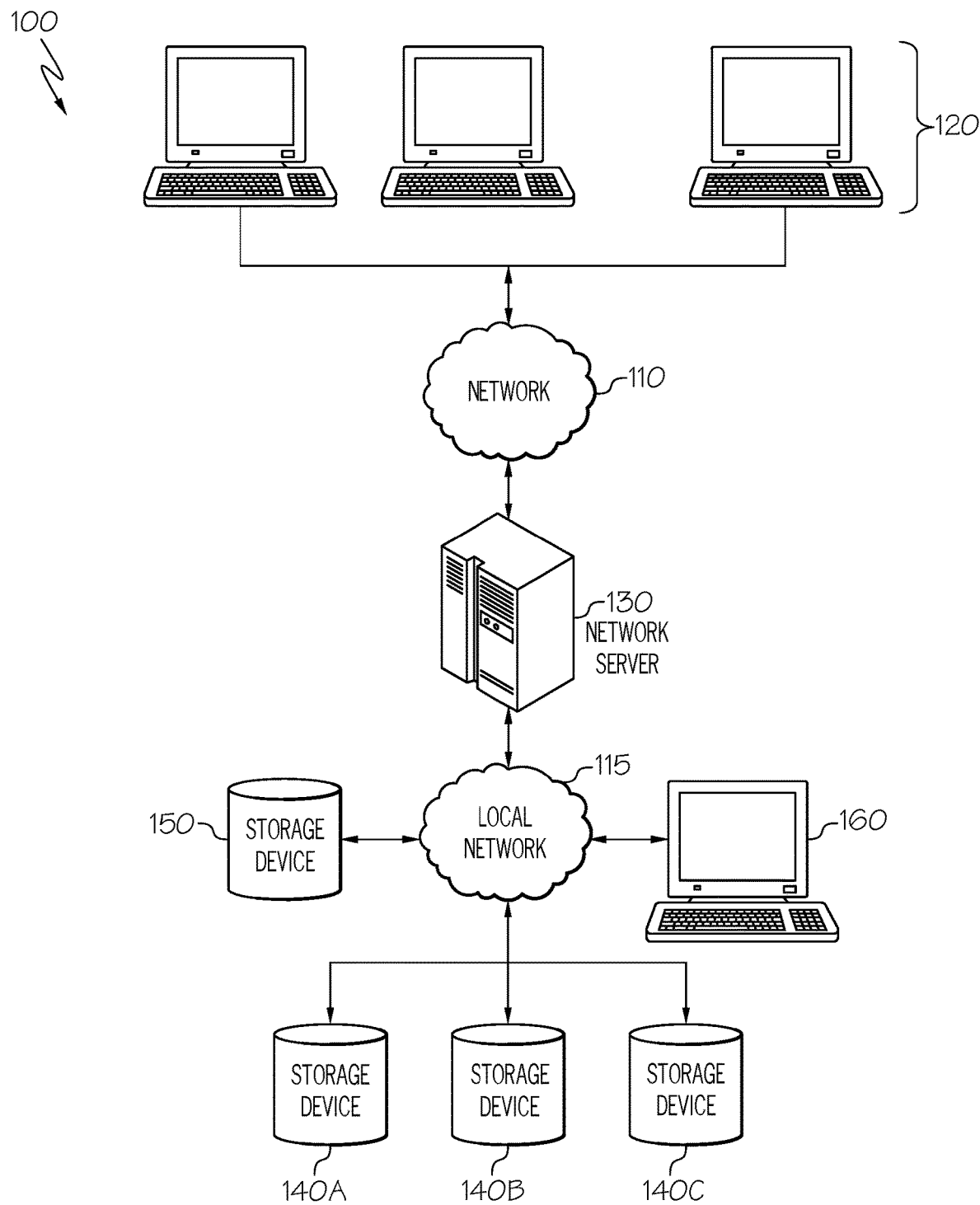
FIG. 1 is a simplified block diagram of an example of some components of a communication system for dynamically reorganizing a dataset using online migration, while allowing concurrent user access to data in the dataset, according to at least one embodiment of the present disclosure.

As will be appreciated by one skilled in the art, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely in hardware, entirely software (including firmware, resident software, micro-code, etc.) or combining software and hardware implementations that may all generally be referred to herein as a "circuit," "module," "component," "manager," "gateway," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium includes the following: a portable computer diskette, a hard disk, a random access memory (RAM), a read-only memory (ROM), a programmable read-only memory (PROM), an erasable programmable read-only memory (EPROM or Flash memory), an electrically erasable read only memory (EEPROM), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, radio frequency (RF), etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "C" programming language, Visual Basic, Fortran 2003, Perl, COBOL 2002, PHP, ABAP, assembly language, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenarios, the remote computer may be connected to the user's computer through any type of network, including a local area network (LAN) or a wide area network (WAN), or the connection may be made through an external computer (for example, through the Internet using an Internet Service Provider) or in a cloud computing environment or offered as a service such as a Software as a Service (SaaS). Generally, any combination of one or more user computers and/or one or more remote computers may be utilized for executing the program code.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that, when executed, can direct a computer, other programmable data processing apparatus, or other devices to function in a particular manner, such that the instructions when stored in the computer readable medium produce an article of manufacture including instructions that, when executed, cause a computer to implement the function/act specified in the flowchart and/or block diagram block or blocks. The computer program instructions may also be loaded onto a computer, other programmable instruction execution apparatus, or other devices to cause a series of operations to be performed on the computer, other programmable apparatuses or other devices to produce a computer implemented process such that the instructions, which execute on the computer or other programmable apparatus, provide processes for implementing the functions/acts specified in the flowchart and/or block diagram block or blocks.

Referring now to FIG. 1, a simplified block diagram is shown illustrating an example communication system 100 for dynamically reorganizing a dataset using online data migration while allowing concurrent user access to data in the dataset according to at least one embodiment. In communication system 100, a network 110 (e.g., a wide area network such as the Internet) facilitates communication between network user terminals 120 and a network server 130. Network server 130 may be configured to communicate with and manage data storage devices 140A, 140B, 140C, and 150, such as direct-access storage devices (DASDs). Network user terminals 120 can enable users to interface with network server 130 and to consume data contained in storage devices (e.g., 140A-140C, 150). A user terminal 160 may be used to enable an authorized user, such as a Database Administrator (DBA), to communicate with and issue commands to network server 130 to access the storage devices. In other embodiments, user terminal 160 could be directly connected to network server 130 or could be remotely connected to network server 130 over the Internet, for example. Also, although storage devices 140A-140C and 150 are shown as separate storage devices communicating with network server 130 via local network 115, it should be apparent that one or more of these storage devices may be combined in any suitable arrangement and that any of the storage devices 140A-140C and 150 may be connected to network server 130 directly or via some other network (e.g., wide area network, etc.).

In at least one embodiment, network server 130 is configured to dynamically reorganize an existing dataset of a storage device (e.g., 140A-140C) while allowing concurrent user access (e.g., retrieving, reading, modifying, adding, deleting, etc.) of data in that dataset. A new (target) dataset can be allocated on a separate storage device (e.g., 150) that offers the same architecture with the same block size but may offer a greater or lesser capacity or size as the capacity of the existing (source) dataset. In other scenarios, the target dataset may offer a capacity that is equal to the capacity of the source dataset. Once the target dataset is allocated, data from the source dataset can be migrated in native sequence to the newly allocated target dataset.

For purposes of illustrating certain example techniques of communication system 100 for dynamically reorganizing a dataset using online data migration while allowing concurrent user access to data of the dataset, it is important to understand the activities that may be occurring in a network environment that includes data storage devices configured with data structures capable of hosting large quantities of data and providing online user access to the data. The following foundational information may be viewed as a basis from which the present disclosure may be properly explained.

Data structures are used by storage devices (e.g., MSDs, DASDs) to store massive amounts of data across virtually every sector of society including, but not limited to, social media, business, retail, health, education, and government. A database is one type of data structure and generally refers to an organized collection of data. Although the concepts presented herein are applicable to any type of data structures used in storage devices, most of the world's data is stored in a data structure commonly referred to as a database. Therefore, although the discussion herein may reference databases for ease of illustration, it should be understood that the concepts are also applicable to other types of data structures.

Databases can have a logical structure that an end user can view online, such as logical data columns arranged in logical data rows. These logical data columns are stored in a logical data table. A database can contain any number of data tables. One or more data tables can be stored in a dataset of a storage device. A dataset is the physical storage of a storage device and is typically a long string of data representing data bytes. Data rows and logical data columns are configured in data tables to enable data to be retrieved and presented in a user-friendly format.

Generally, large database environments are created by defining the relevant dataset architecture to have a particular block size and a particular capacity (or size) based on current preferences, requirements, and/or needs. An entity (e.g., via a DBA) may define its DASD architectures using various different block sizes based on particular preferences, needs, and/or implementations, which may vary over time. Data, such as logical data rows, is stored in physical data blocks. These physical data blocks can range in size depending on the platform and the DASD hardware. For example, on the mainframe, block sizes can be up to 32K bytes and are defined per user application. When data is requested (e.g., read request from a user or utility process), a data block containing the data row in which the requested data is located can be retrieved and transferred into memory. The actual transferred data block is stored in memory, which is also referred to herein as "data buffer," "buffer" or "buffer memory."

Data rows are typically loaded into a dataset in a native sequence. The term 'native sequence' and 'native key sequence' as used herein is intended to mean a preferred sequence that is specified for data rows in a dataset. Often, the preferred sequence is selected by an entity (e.g., a DBA of the entity) based on the likely performance impact of the selected sequence relative to other possible sequences. In at least some implementations, the native sequence may correspond to the most likely processing order of the data rows. If data requests (e.g., user requests, batch utility process requests) are typically made in a particular order, then the performance of the database may increase if data rows are stored in the dataset in the order of the most common data requests to the least common data requests. In an example scenario, some databases related to human resources of an entity (e.g., enterprise, educational institution, governmental organization, etc.) may store information associated with each employee of the entity. In this scenario, if most user and/or batch requests are made based on particular employees, then the native sequence may be based on an employee identifier (employee ID) contained in each data row. In at least some implementations a key value indicating a place in the native sequence corresponds to each data row.

Data rows in most datasets, however, do not remain in their native sequence. Each data row addition and each data row deletion can impact the sequence of the data rows and cause the actual sequence to deviate from the native sequence. Many databases offer 24/7 access to users and consequently, datasets may be continuously updated by those users. Consequently, over time, a dataset can become increasingly out-of-sequence. Reorganization of a dataset in native sequence is often needed to improve performance and may require either database downtime (offline reorganization) or a sufficient amount of free space within the database itself to enable the reorganization (online reorganization). In a different method, the database can be copied to a separate "shadow" copy that is kept offline and reorganized while the original copy continues to update. Once the shadow copy is reorganized, a complex process is used to reapply any changes that occurred in the original copy to the shadow copy until at some point the original copy and shadow copy are logically the same. At that point, a brief outage is taken to replace the original copy with the shadow copy. Once replaced user access can be restarted. If a system failure or database abnormal termination occurs, however, the shadow copy becomes unusable and the user reverts back to the original copy until a time occurs where the shadow reorganization can be attempted again.

In past decades, entities seeking to reorganize their datasets back to native sequence (or to a new native sequence) typically had certain windows of opportunity when their databases would go offline (e.g., for periodic maintenance, etc.) and would be inaccessible to users. As the interconnected world has evolved, however, many applications no longer have a scheduled offline period. Rather, many consumers and other users expect 24/7 access to online data needed to conduct business, purchase goods, manage finances, access services (e.g., transportation, etc.), etc. Although most datasets benefit in performance from periodic or regular reorganization in native sequence, often the user data in the out-of-sequence datasets cannot be taken offline.

In one example, consumers may expect 24-hour access to a retailer's online application so that goods (e.g., shoes, clothing, electronics, cosmetics, etc.) can be purchased whenever the consumer desires. In another example, some interconnected systems around the world require availability to certain types of data across time-zones. For example, a country's customs/border control branch may require an online vetting application to be available at all times to allow transportation services (e.g., airlines, railroads, water transport, etc.) to receive clearance for travelers into the country.

Although current online dataset reorganization techniques may be beneficial in many implementations, their effectiveness may diminish in certain scenarios. In one current technique, online dataset reorganization may become less effective as the actual size of the dataset approaches its capacity. This can result because a certain amount of free space in the dataset is needed to perform the reorganization. For example, 20% of blocks in a dataset may be free at the end of a data structure. During the online reorganization, data rows are copied into the free space of the dataset in a preferred order (e.g., native sequence). As data rows are copied into the free space, some blocks in the other 80% become available. Once the 20% of blocks have been filled, the process can continue copying data rows in order into the newly freed blocks in the other 80% of blocks. This can continue until the reorganization is complete or until no more free blocks exist in the dataset. The latter scenario may occur if there is limited free space and/or if the data rows are distributed across all blocks in such a manner that eventually, even though the reorganization is not complete, no block is free. Thus, if a dataset grows in size over time, or if an entity selects a dataset capacity without sufficient free space to perform an online dataset reorganization, this current online reorganization technique may be inadequate in these scenarios. As noted above, the shadow online reorganization technique adds significant complexity and requires brief interruptions to user access to copy and then recopy the data.

Current online reorganization techniques also do not offer a solution for resizing a dataset while performing an online reorganization that allows users to have concurrent access to the dataset. Resizing a source dataset can involve modifying the capacity or size of a target dataset to be greater than or less than the size of the source dataset. Increasing the size of a source dataset may be desired, for example, if the number of data rows in the dataset has grown or is expected to grow (e.g., due to business growth, etc.) and needs to accommodate more data. Decreasing the size of a source dataset may be desired if the number of data rows in the source dataset has shrunk (e.g., due to business downsizing, etc.), leaving excess free space in the dataset that is wasted.

Thus, several scenarios can result in existing dataset capacities being inadequate or inefficient such that resizing the dataset can be advantageous and potentially even necessary. Furthermore, reorganization in native sequence generally increases the performance of existing datasets, regardless of whether the dataset would benefit from resizing.

Figure 2:
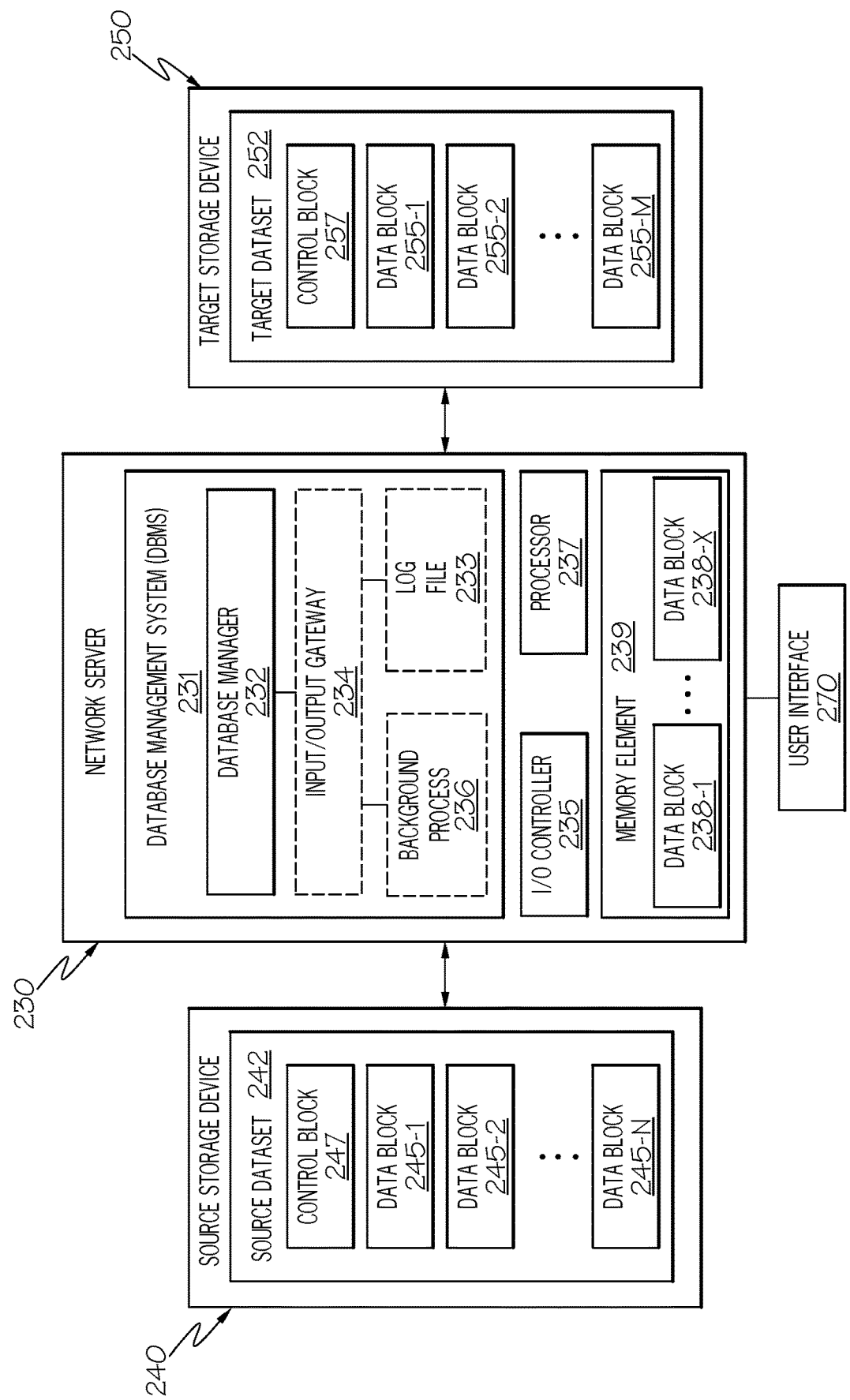
FIG. 2 is a simplified block diagram illustrating additional details of certain components of the communication system according to at least one embodiment.

A communication system, such as communication system 100 for dynamically reorganizing an existing dataset, as outlined in FIGS. 1 and 2, can resolve these issues and others. This system enables a source dataset to be simultaneously reorganized in native sequence and resized to a larger or smaller capacity target dataset without interruption to users who are accessing the database tables that reside on that source dataset. For example, a database administrator (DBA) may determine that one or more database datasets are defined in a non-optimally sized dataset. The DBA determines that processing for the data tables on this dataset could be improved by re-sizing the source dataset to better fit current data storage needs. The DBA can define a new target dataset on a storage device having the same architecture (e.g., same device type, same block size). The target device can be configured with the preferred capacity, which may be greater than or less than the capacity of the source dataset but sized appropriately to contain all of the data rows in the source dataset. In other implementations, a target dataset can be automatically defined based on default or pre-defined capacity specifications. When ready, the DBA (or an automatic process), can trigger a background migration process where each data row is migrated from the old source dataset to the new target dataset without interrupting the end user access on the data tables. This system also enables a source dataset to be reorganized in native sequence to a target dataset of the same size without interruption to users who are accessing the database tables that reside on that source dataset.

More specifically, a DBA (or automatic process) can allocate a target dataset to have the same block size and the same device type as the source dataset and can select the preferred capacity or size of the dataset. For example, an existing dataset defined on an IBM 3390 with a 4K block size and a capacity of 1 G may be resized to a target dataset defined on an IBM 3390 with a 4K block size and an increased capacity of 2 G. In another example, an existing dataset defined on an IBM 3390 with a 4K block size and a capacity of 1.5 G may be resized to a target dataset defined on an IBM 3390 with a 4K block size and a decreased capacity of 1 G. In yet another example, an existing dataset defined on an IBM 3390 with a 4K block size and a capacity of 1.5 G may be migrated to a target dataset defined on an IBM 3390 with a 4K block size and a same-sized capacity of 1.5 G.

Once a target dataset is allocated, a dataset reorganization process can be triggered when desired. In one embodiment, the dataset reorganization process may first establish that the target dataset is sufficiently sized and suitably architected to hold the data tables being migrated from the source dataset. The dataset reorganization process can establish an input-output (I/O) gateway around the source and target datasets to maintain consistency of reference for all data rows that are migrated from the source dataset to the target dataset. The I/O gateway begins migrating logical data rows from one or more data blocks in the source dataset to a data block in the target dataset. The data rows are migrated independently of data blocks in the source dataset. Because the data rows are migrated in native sequence from the source dataset to the target dataset, each successive data row copied to the target dataset in native sequence may or may not be located in the same block in the source dataset. Transactional logging may be provided for all data rows to enable a fully restartable and recoverable process in the event of an unintentional processing failure (e.g., power outage, processor failure, system failure, and other abnormal terminations, etc.).

One or more embodiments manage concurrent access to data in the datasets as data rows are migrated from the source dataset to the target dataset. End user processing is performed by logical data row and does not require a data row to be housed in a particular dataset related to the migration. Thus, the I/O gateway manages access to the data rows by end users, where a particular data row may be accessed from either the source dataset or the target dataset depending upon whether it has been migrated at the time of the user request. The I/O gateway can also manage data row accesses by other database utility processes. This is achieved by ensuring that the data row migration is integrated with these other utility processes. For example, a utility process that attempts to run concurrently with I/O gateway may be blocked until a particular data row migration is complete. However, for at least some utility processes, the utility process is automatically integrated with the I/O gateway, which manages accesses to the source and target datasets by the utility process and allows for successful completion. In some cases, where the requested utility process is blocked because it conflicts with the migration process, an alternative utility process may be provided that performs the utility function integrated with the I/O gateway.

In one or more embodiments, the dataset reorganization process can be completed by renaming the target dataset to the original name of the source dataset. The source dataset may be deleted or renamed. It should also be noted that multiple datasets can be dynamically reorganized at the same time. An I/O gateway can be created for each dataset being reorganized.

Embodiments of a dataset reorganization process described herein can offer several advantages. For example, one or more embodiments enable DBAs to quickly reorganize datasets by performing an online migration of data rows from a source device to a target device while allowing concurrent user access. The allocated dataset in the target device may have a capacity that is greater than or less than the capacity of the dataset in the source device, as long as the dataset in the target device is appropriately sized to contain all of the data rows in the data tables of the source device. Resizing a source dataset to a smaller capacity can improve performance by reducing wasted free space. Resizing a source dataset to a larger capacity can enable growth of the dataset, for example, when the business or other entity associated with the source dataset is expanding. Embodiments described herein enable resizing for entities for which user downtime is not possible. Datasets can be resized using online migration while allowing concurrent user access. Additionally, even dynamic reorganizations of a source dataset to a same-sized target dataset can be advantageous. For example, the reorganization may be more efficiently achieved by performing online migration while allowing concurrent user access as compared to reorganizing data rows within the same dataset utilizing free space of the dataset while allowing concurrent user access.

Turning to FIG. 1, a brief description of the infrastructure of communication system 100 is now provided. Elements of FIG. 1 may be coupled to one another through one or more interfaces employing any suitable connections (wired or wireless), which provide viable pathways for network communications. Additionally, any one or more of these elements of FIG. 1 may be combined or removed from the architecture based on particular configuration needs.

Generally, communication system 100 can be implemented in any type or topology of networks. Within the context of the disclosure, networks such as networks 110 and 115 represent a series of points or nodes of interconnected communication paths for receiving and transmitting packets of information that propagate through communication system 100. These networks offer communicative interfaces between sources, destinations, and intermediate nodes, and may include any local area network (LAN), virtual local area network (VLAN), wide area network (WAN) such as the Internet, wireless local area network (WLAN), metropolitan area network (MAN), Intranet, Extranet, virtual private network (VPN), and/or any other appropriate architecture or system that facilitates communications in a network environment or any suitable combination thereof. Additionally, radio signal communications over a cellular network may also be provided in communication system 100. Suitable interfaces and infrastructure may be provided to enable communication with the cellular network.

In general, "servers," "clients," "computing devices," "storage devices," "network elements," "database systems," "network servers," "user devices," "user terminals," "systems," etc. (e.g., 120, 130, 140A-140C, 150, 160, etc.) in example communication system 100, can include electronic computing devices operable to receive, transmit, process, store, or manage data and information associated with communication system 100. As used in this document, the term "computer," "processor," "processor device," "processing device," or "I/O controller" is intended to encompass any suitable processing device. For example, elements shown as single devices within communication system 100 may be implemented using a plurality of computing devices and processors, such as server pools including multiple server computers. Further, any, all, or some of the computing devices may be adapted to execute any operating system, including IBM zOS, Linux, UNIX, Microsoft Windows, Apple OS, Apple iOS, Google Android, Windows Server, etc., as well as virtual machines adapted to virtualize execution of a particular operating system, including customized and proprietary operating systems.

Further, servers, clients, computing devices, storage devices, network elements, database systems, network servers, user devices, user terminals, systems, etc. (e.g., 120, 130, 140A-140C, 150, 160, etc.) can each include one or more processors, computer-readable memory, and one or more interfaces, among other features and hardware. Servers can include any suitable software component, manager, controller, or module, or computing device(s) capable of hosting and/or serving software applications and services, including distributed, enterprise, or cloud-based software applications, data, and services. For instance, in some implementations, a network server 130, storage devices 140A-140C and 150, or other subsystem of communication system 100 can be at least partially (or wholly) cloud-implemented, web-based, or distributed to remotely host, serve, or otherwise manage data, software services and applications interfacing, coordinating with, dependent on, or used by other services, devices, and users (e.g., via network user terminal, other user terminals, etc.) in communication system 100. In some instances, a server, system, subsystem, or computing device can be implemented as some combination of devices that can be hosted on a common computing system, server, server pool, or cloud computing environment and share computing resources, including shared memory, processors, and interfaces.

While FIG. 1 is described as containing or being associated with a plurality of elements, not all elements illustrated within communication system 100 of FIG. 1 may be utilized in each alternative implementation of the present disclosure. Additionally, one or more of the elements described in connection with the examples of FIG. 1 may be located externally to communication system 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

FIG. 2 is a simplified block diagram that illustrates additional possible details that may be associated with certain components of communication system 100. Specifically, a network server is one possible example of network server 130, a source storage device 240 is one possible example of storage devices 140A, 140B, and/or 140C, and target storage device 250 is one possible example of storage device 150. The elements of FIG. 2 are representative of possible components related to a dataset reorganization process in which data rows in a source dataset 242 of source storage device 240 are reorganized into native sequence by performing an online migration to a target dataset 252 of target storage device 250 while allowing concurrent user access.

Network server 230 may include a database management system (DBMS) 231, which creates and manages databases, including providing batch utilities, tools, and programs. A database manager 232 can create a database processing region where user processing and most utility processes flow. During a dataset reorganization process, database manager 232 can create an input/output (I/O) gateway 234. In at least one embodiment, I/O gateway 234 may be created temporarily in software and removed from DBMS 231 once the migration and reorganization are completed. I/O gateway 234, when executed, can create a background process 236, which migrates data rows from a source dataset (e.g., 242) to a target dataset (e.g., 252) in native sequence, while I/O gateway 234 handles concurrent user processing to access the data rows being migrated. I/O gateway 234 can also create a log file 233 to store information related to each data row migration. Thus, log file 233 can provide information that enables restartability and recoverability if the dataset reorganization process experiences a failure (e.g., power outage, system failure, etc.). Log file 233 may be implemented internal or external to DBMS 231, based on particular implementations and needs. In FIG. 2, log file 233 is shown as internal to DBMS 231 in storage.

Network server 230 may also include hardware including, but not limited to, an I/O controller 235, a processor 237, and a memory element 239. The I/O controller 235 may facilitate communication to both source storage devices (e.g., 240) and target storage devices (e.g., 250), or in other implementations, multiple I/O controllers may be used. In some implementations, a user interface 270 may also be coupled to network server 230. User interface could be any suitable hardware (e.g., display screen, input devices such as a keyboard, mouse, trackball, touch, etc.) and corresponding software to enable an authorized user to communicate directly with network server 230. For example, in some scenarios, a DBA may configure target datasets and initiate the dataset reorganization process using user interface 270.

At any given time, memory element 239 may contain data blocks 238-1 through 238-X, which are loaded into memory based on user access requests received for data rows contained in those blocks. In at least one embodiment, memory element 239 may contain buffer memory and data blocks 238-1 through 238-X may be loaded into buffers in the memory. Multiple users may access, via user terminals, data rows in data blocks of source storage device 240 (or other storage devices) that are loaded into memory element 239. Database manager 232 can also be configured to manage concurrency control for users accessing data rows simultaneously, so that adverse effects are prevented if multiple users try to modify resources other users are actively using.

Source storage device 240 and target storage device 250 are representative of physical storage devices capable of storing data in data structures (e.g., databases) that enable multiple users, processes, and utilities to access and, in some cases, modify the stored data. Each storage device 240 and 250 includes a respective dataset 242 and 252, which is the physical storage of data in the storage device. Prior to a dataset reorganization process being performed, source dataset 242 may store data in data blocks 245-1 through 245-N. In at least some embodiments, during the dataset reorganization process, a control block 247 may be added to unused space in source dataset 242 to hold information related to the data migration. In one example, a key value indicating a place in the native sequence may be associated with each data row in source dataset 242. The key value associated with the last successfully migrated data row may be stored in control block 247.

Target dataset 252 may be allocated with defined blocks, such as data blocks 255-1 through 255-M, prior to a dataset reorganization process being initiated for source dataset 242. During the dataset reorganization process, a control block 257 may be added to unused space in target dataset 252 to hold information related to the data migration. In one example, a key value indicating a place in the native sequence may be associated with each data row in target dataset 252. The key value associated with the last successfully migrated data row may be stored in control block 257. A background migration process can cause data blocks 255-1 through 255-M to be filled with data rows from source dataset 242.

In at least one scenario, source dataset 242 may be defined with a same block size as target dataset 252. For example, source dataset 242 may be defined on a DASD device with a 4K block size (e.g., IBM 3390 with a 4K block size). A selected capacity available on the source storage device may be allocated for the source dataset. Target dataset 252 may be defined on the same or similar DASD device with a 4K block size. A selected capacity available on the target storage device may be allocated for the target dataset. It should be noted that in some scenarios, multiple datasets may be defined on a single storage device.

Three possible scenarios related to the capacities of the source and target datasets are possible. In a first scenario, the capacity of the target dataset is equivalent to the capacity of the source dataset. In this first scenario, for example, the number of possible data blocks 255-1 through 255-M in target dataset 252 is the same as the number of possible data blocks 245-1 through 245-N in source dataset 242 (i.e., M=N). In a second scenario, the capacity of the target dataset is greater than the capacity of the source dataset. In this second scenario, for example, the number of possible data blocks 255-1 through 255-M in target dataset 252 is greater than the number of possible data blocks 245-1 through 245-N in source dataset 242 (i.e., M>N). In a third scenario, the capacity of the target dataset is less than the capacity of the source dataset. In this third scenario, the number of possible data blocks 255-1 through 255-M in target dataset 252 is less than the number of possible data blocks 245-1 through 245-N in source dataset 242 (i.e., M<N). Consequently, when the migration of source dataset 242 to target dataset 252 is completed, the number of data blocks (M) in target dataset 252 may be different than the number of data blocks (N) in source dataset 242 if the capacities of the datasets are different.

Turning to FIGS. 3A-3K, block diagrams illustrate an example scenario of a database environment and a dataset reorganization process applied to a dataset within the environment according to embodiments disclosed herein. A communication system 300 includes network user terminals 320, a DBA user terminal 360, a database manager 332 with a data processing region 337, a memory 339, and storage devices 340A-340C of a database environment managed by database manager 332. The database environment can include multiple database datasets (e.g., 342A, 342B, 342C). The datasets contain logical data tables and the datasets may be stored in multiple architectures (e.g., the same or different device types, the same or different block sizes, the same or different capacities). User data rows are stored as logical data table(s) in the datasets. It should be apparent that communication system 300 includes certain components that correspond to components similarly named and described with reference to communication system 100 in FIGS. 1-2.

Figure 3A:
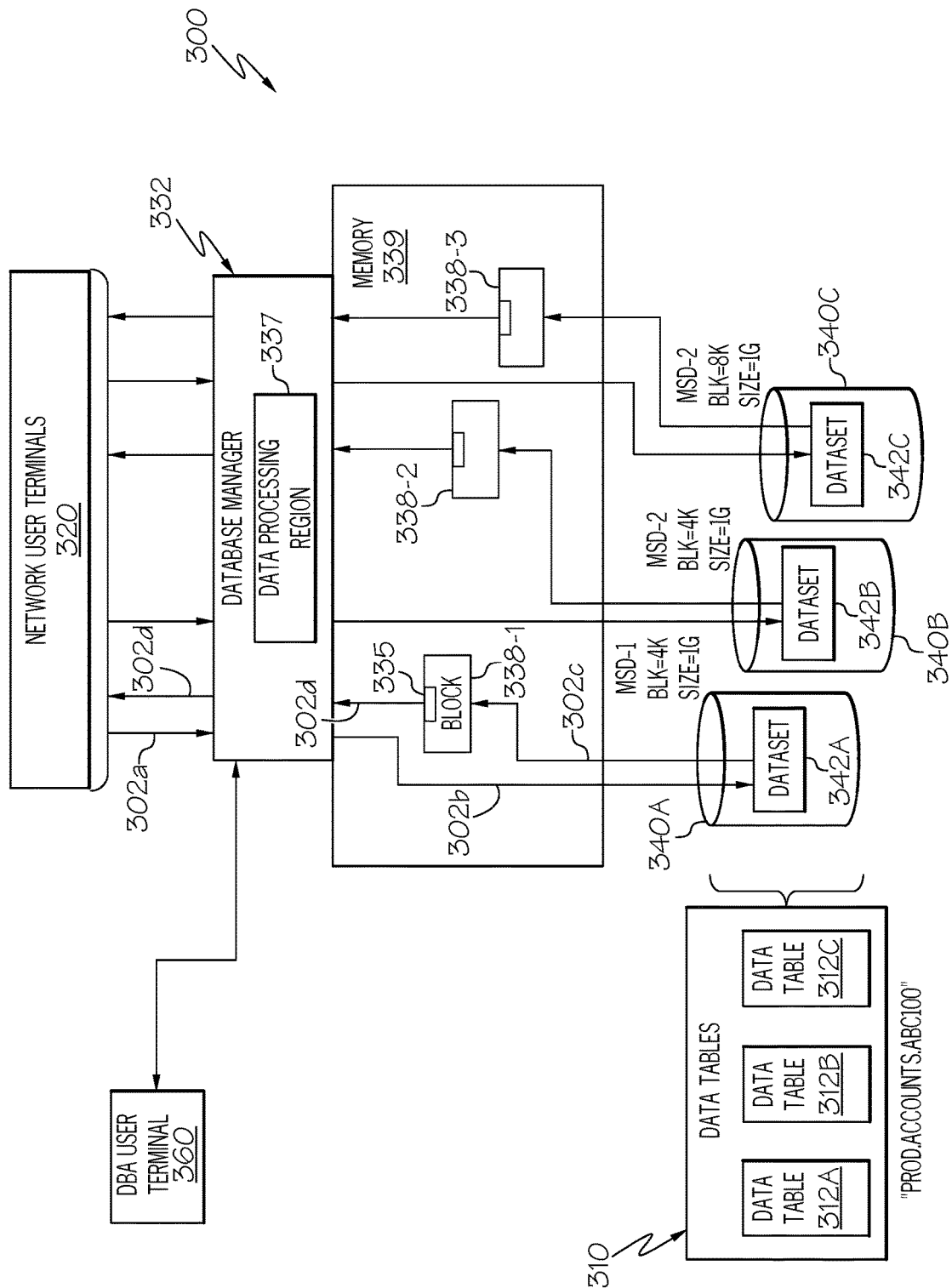
FIGS. 3A-3K are block diagrams illustrating an example scenario of the communication system in which a dataset is dynamically reorganized using online migration and allows concurrent user access according to at least one embodiment.

With reference to FIG. 3A, an example database environment scenario is shown. Data storage devices 340A-340C contain respective datasets 342A-342C. Data tables 310 are stored in dataset 342A, and the other data tables (not shown) are stored in the other datasets 342B and 342C of the database. Each data table 312A-312C stored in dataset 342A may contain different information (e.g., customer information, order information, inventory information, etc.). For example, data table 312A may be a customer data table, data table 312B may be an order data table, and data table 312C may be an inventory data table. Each dataset has a unique file name and, in this example scenario, dataset 342A has a file name of "PROD.ACCOUNTS.ABC100."

Also in this example scenario, datasets 342A-342C are shown with different architectures. Dataset 342A is defined on a first mass storage device type (MSD-1) with a block size of 4K bytes and a capacity of 1 gigabyte (1G). Dataset 342B is defined on a second mass storage device type (MSD-2) with a block size of 4K bytes and a capacity of 1G. Dataset 342C is defined on another MSD-1 with a block size of 8K bytes and a capacity of 1G.

Data processing region 337 receives flows of user requests from users via network user terminals 320 and from database administrator(s) via DBA user terminal 360. Data processing region 337 can also receive database access requests from utility and other non-end user processes. In operation, multiple users (e.g., tens, hundreds, thousands, etc.) can access the database concurrently via network user terminals 320. FIG. 3A shows concurrent user requests (e.g., for data access or modification) for data contained in each of the datasets 342A-342C. An example user request will now be described with reference to dataset 342A. For illustrative purposes, the description is based on a user request for a data row in the customer data table 312A, which is stored in dataset 342A.

At 302a, a user requests, via a network user terminal 320, access to a customer data row in customer data table 312A. Data processing region 337 receives the user request. At 302b, data processing region 337 determines the location of a data block that contains the requested data row. In this example, data processing region 337 determines the location of the data block, which is in dataset 342A of storage device 340A.

At 302c, data processing region 337 retrieves into memory 339 the identified data block from the appropriate dataset holding the customer data table. The data block is retrieved into memory as block 338-1, with requested data row 335. In one example, block 338-1 may be stored in buffer memory of memory 339. At 302d, the requested data row 335 is extracted and returned to the network user terminal that submitted the user request at 302a.

User accesses to other data tables (e.g., 312B, 312C) may occur at least partially concurrently (or not concurrently) with the user access of customer data table 312A. In addition, other user accesses to customer data table 312A may also occur at least partially concurrently (or not concurrently) with the user access shown and described in FIG. 3A. These other user requests may be directed to data rows in other data blocks or in the same data block 338-1. Database manager 332 manages the concurrency of concurrent user requests for access and/or modifications to data contained in the same data table. In addition, as shown in FIG. 3A, user accesses to other data tables in different datasets (e.g., 342B, 342C) may also occur at least partially concurrently (or not concurrently) to the user accesses of data tables 310. It should be apparent that in at least some systems, continuous concurrent access by two or more users is possible.

FIGS. 3B-3K illustrate various stages during a dataset reorganization process according to embodiments described herein, which will now be explained. While normal database processing is occurring (e.g. multiple concurrent user requests), a determination can be made that a dataset is to be reorganized into native sequence by performing an online migration to another dataset having the same block size. In this example scenario, dataset 342A is the source dataset that is to be reorganized by performing an online migration to a target dataset. Currently, source dataset 342A is defined on a first mass storage device type (e.g., MSD-1) with a 4K byte block size and a capacity of 1G.

Figure 3B:
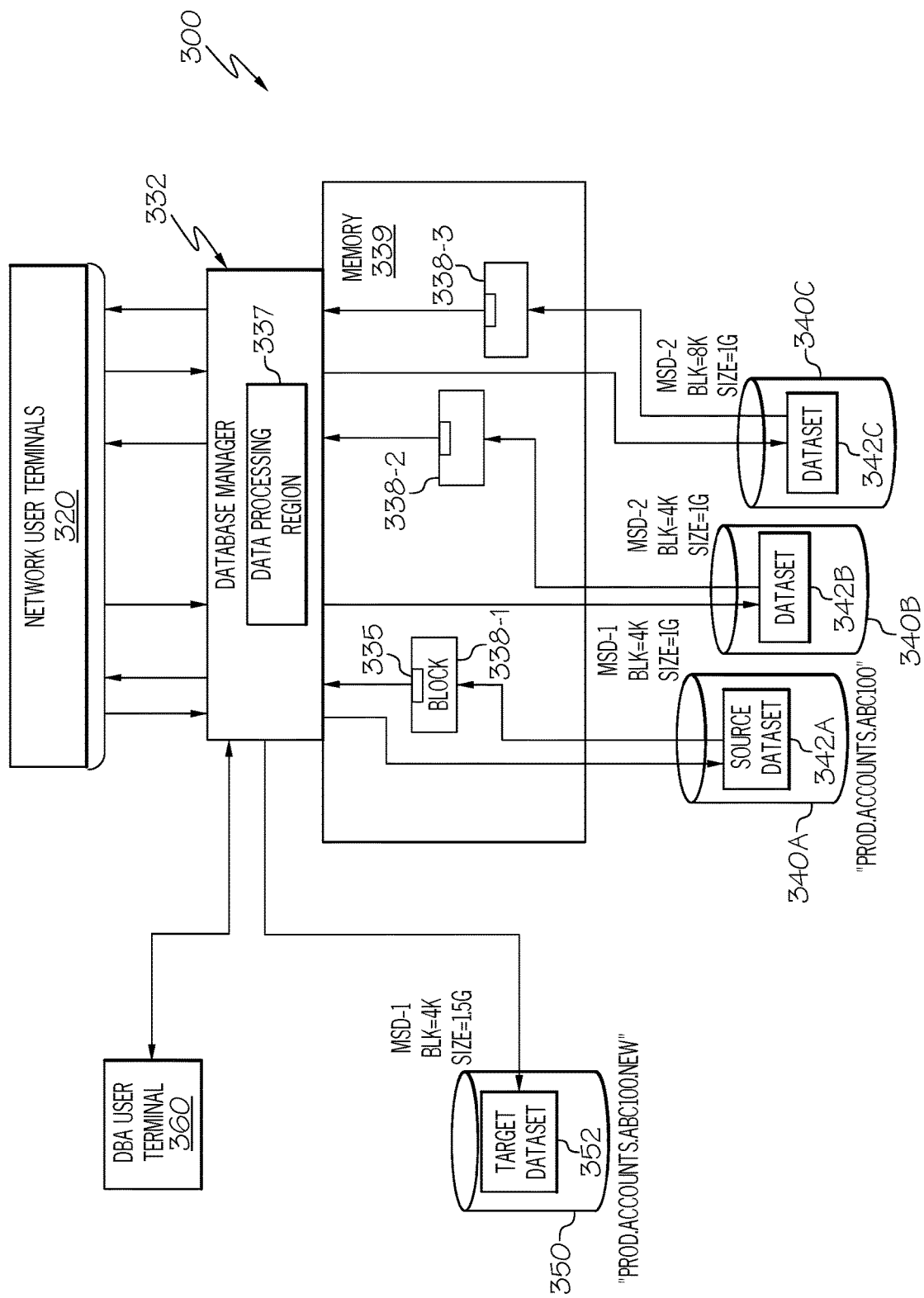

In FIG. 3B, the DBA can access database manager 332 via DBA user terminal 360 to create a new target dataset with the desired capacity. In this example, the DBA allocates a target dataset 352 on a target storage device 350 and defines its architecture as the same type of mass storage device type (MSD-1) and the same block size (4K) as source dataset 342A. In this example, the source dataset is to be resized to increase its capacity in target dataset 352. For example, the capacity of the target dataset is defined as 1.5 G, which will effectively increase the capacity of the source dataset by 0.5 G when the migration is completed. It should be apparent that while a specific capacity of the target dataset is mentioned herein, the capacity of the target dataset may be allocated to be greater than the capacity of the source dataset or less than the capacity of the source dataset as long as the allocated size is sufficient to contain all of the data rows in the source dataset. It should also be apparent that the capacity of the target dataset may be allocated to be equal to the capacity of the source dataset in other scenarios. Thus, any suitable capacity may be selected for a target dataset based on particular scenarios and/or needs.

In addition, target dataset 352 is given a unique file name. In this example, the unique file name is the source dataset file name with an extra qualifier: "PROD.ACCOUNTS.ABC100.NEW." In other embodiments, the target dataset may be allocated and defined dynamically based on default, pre-configured, or algorithmically configured architecture parameters.

A database pre-processing utility application may also be executed to prepare the target dataset for data migration from the source dataset. For example, pre-processing may include verifying the presence of source storage device 340A, target storage device 350, source dataset 342A, target dataset 352, the readiness of target dataset 352 for the data migration, etc. A utility application or the DBA may also ensure that enough buffer memory is available in memory 339 for the new target dataset 352.

Figure 3C:
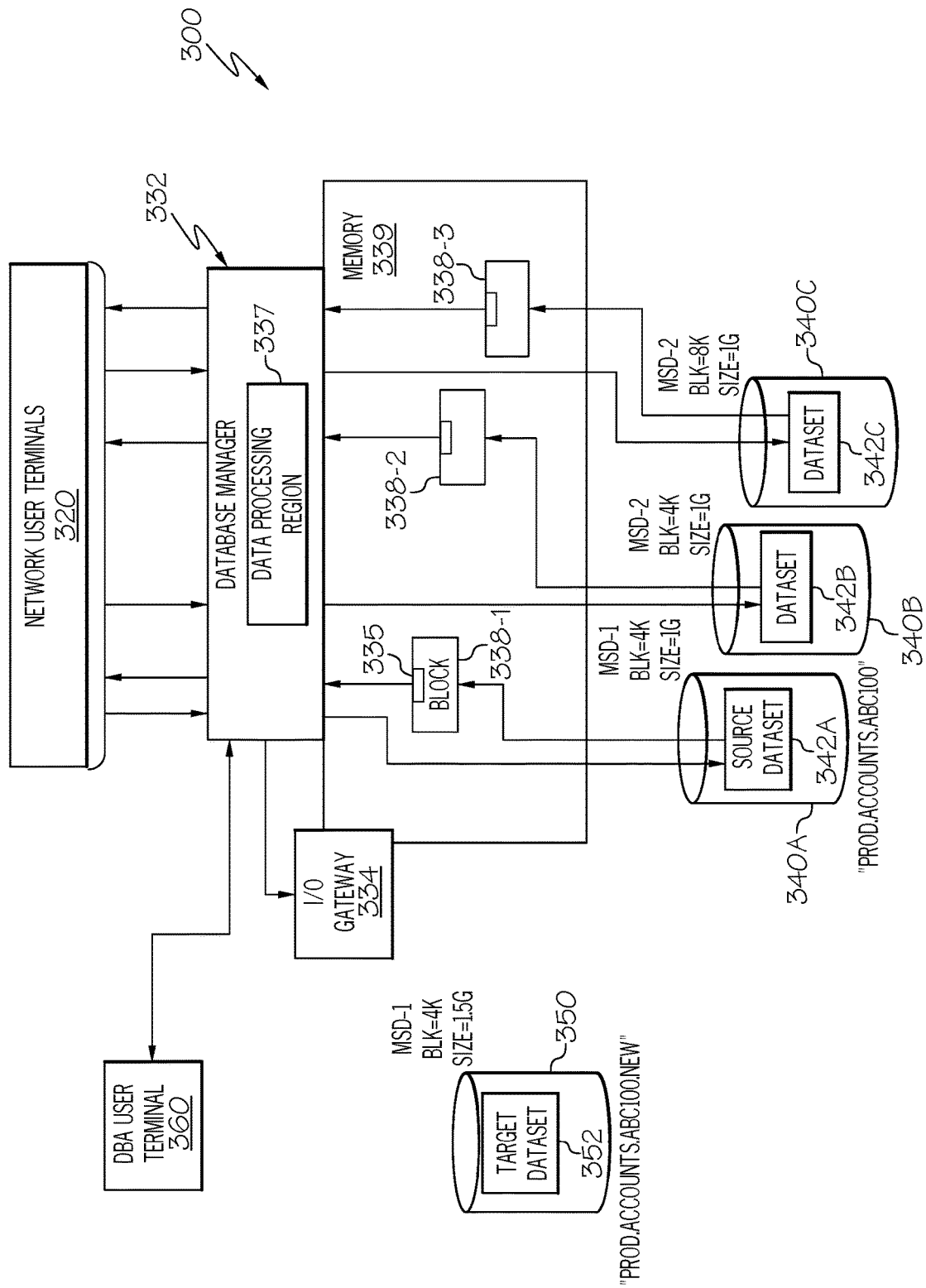

In FIG. 3C, the DBA may issue a command, via the DBA user terminal 360, to cause database manager 332 to begin dataset reorganization processing. According to embodiments disclosed herein, dataset reorganization processing includes migrating data in the source dataset to the target dataset by data rows. Upon receiving the command, database manager 332 may begin periodically outputting status messages to a display (e.g., DBA user terminal 360, a display connected to a network server hosting database manager 332, another remote or local display device, etc.) and/or to a log file of status messages indicating the status of the dataset reorganization process. Initially, database manager 332 may output a start message to indicate the processing has started.

In response to the command to start processing, database manager 332 creates an input/output (I/O) gateway 334 in memory to isolate processing for source dataset 342A while it is being dynamically reorganized into its native sequence. The I/O gateway 334 may be a dynamically generated, temporary process that runs in the same processing region or a separate processing region to handle the data migration of the source dataset to the target dataset and the concurrent user requests (and utility process requests) for access to data in source dataset 342A during the data migration. Database manager 332 forwards, to I/O gateway 334, user requests and utility process requests for access to source dataset 342A. The location of a requested data row in source dataset 342A at any given time during the dataset reorganization process depends on whether the data row has been migrated. I/O gateway 334 keeps track of where each data row is located during the migration and handles user requests (and utility process requests) accordingly.

Figure 3D:
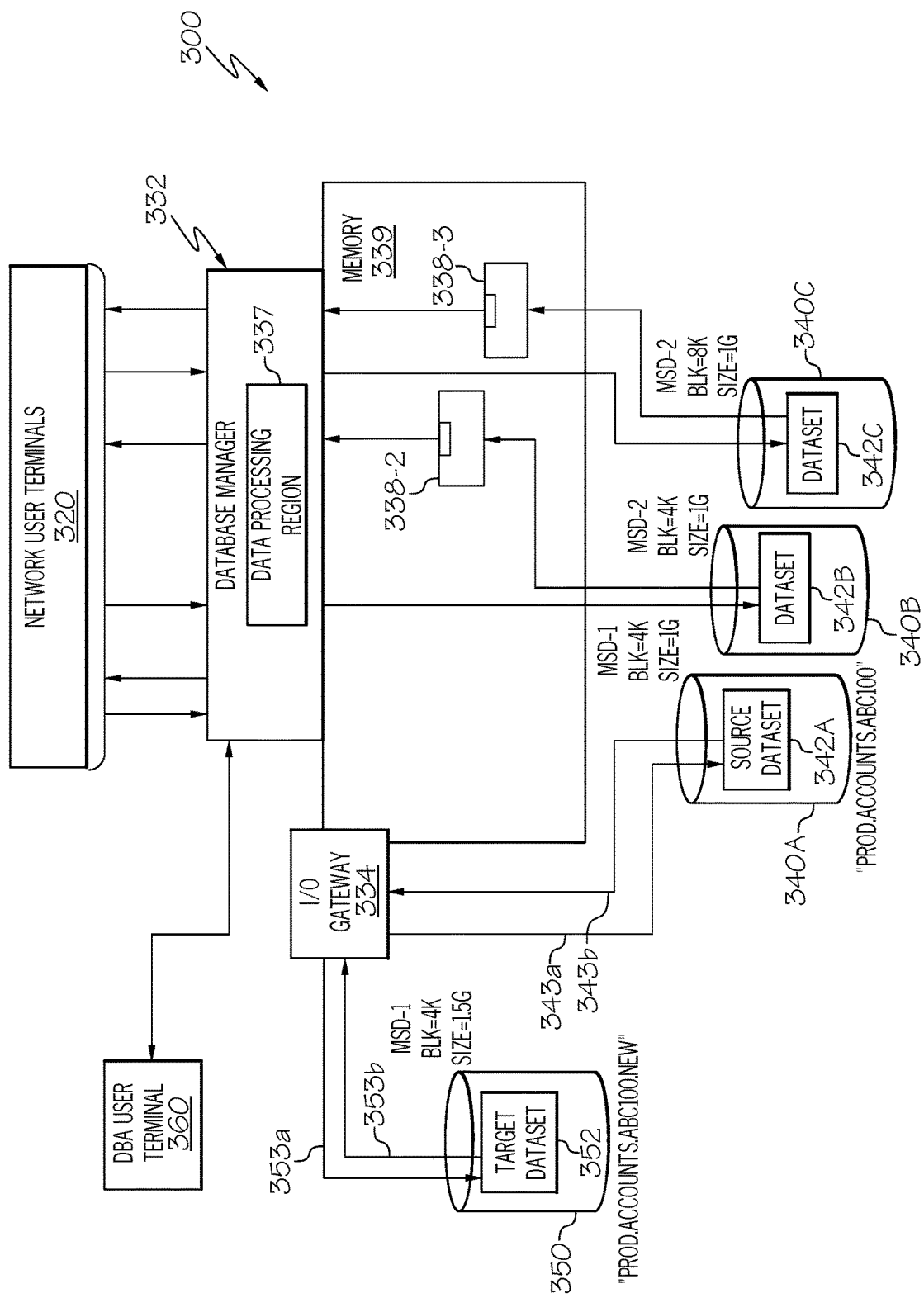

Once the I/O gateway is created, as shown in FIG. 3D, the gateway can issue a command to open both the source dataset 342A and the target dataset 352 and can establish connections (e.g., 353a, 353b, 343a, 343b) to both datasets. I/O gateway 334 can access both source dataset 342A and target dataset 352 and knows which data rows are on which dataset at any given time during the data migration performed during the dataset reorganization process. Thus, I/O gateway 334 maintains exclusive control over the datasets during the data migration. Database manager 332 may also output a status message indicating the I/O gateway is built and the datasets are open.

Figure 3E:
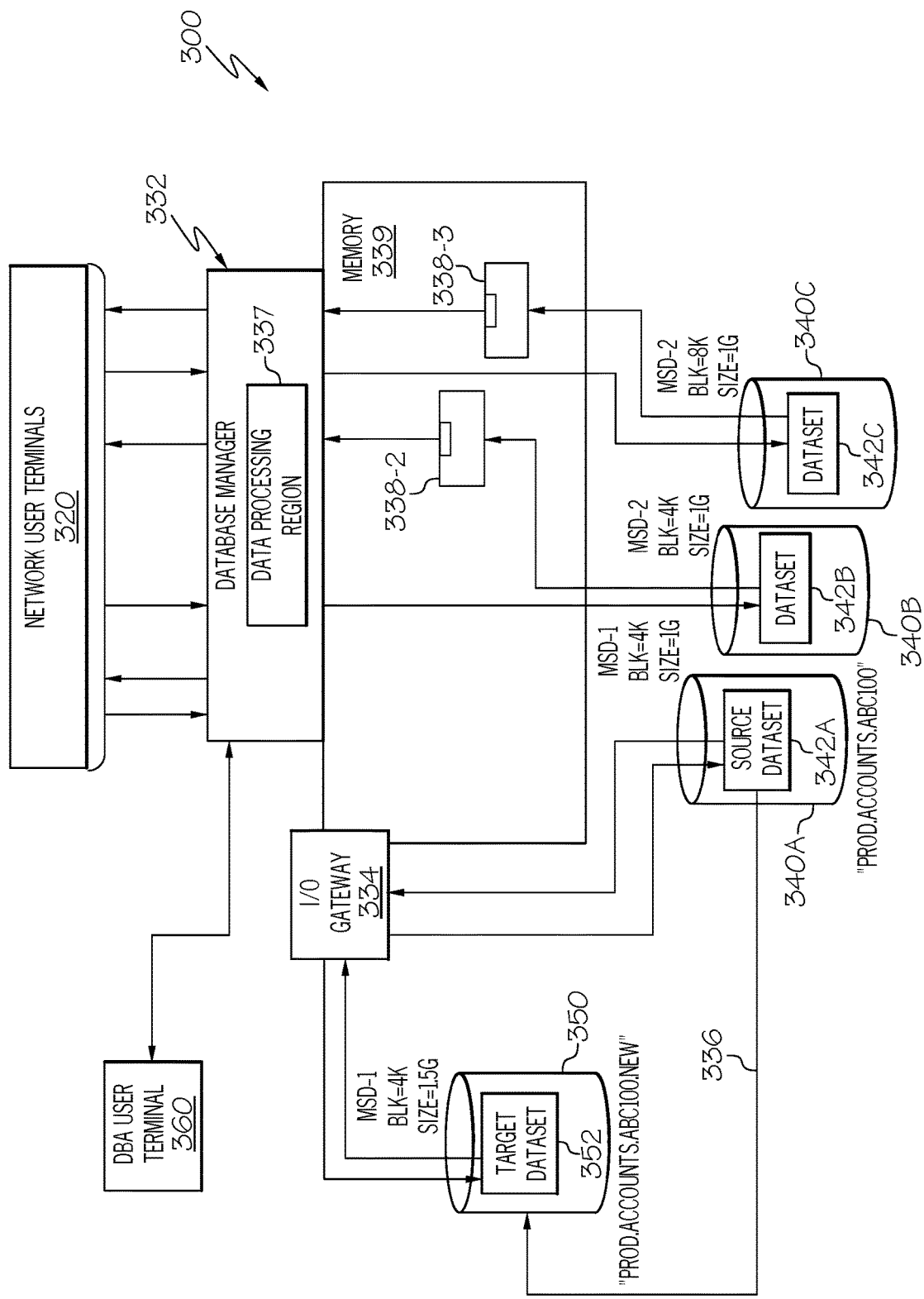

Once the datasets are open and connections are established, as shown in FIG. 3E, I/O gateway 334 creates a background process 336 to migrate data rows from source dataset 342A to target dataset 352. The background process can be invisible to users who may continue to access data in the datasets. Data rows can be migrated by either copying each data row from source dataset 342A to target dataset 352, or by moving (e.g., copying into the new dataset and deleting from old dataset) each data row from source dataset 342A to target dataset 352. If data rows are only copied, then a copy of the data rows may remain in the source dataset upon completion of the migration. If data rows are moved, then they are copied from and deleted from the source dataset. During the migration, database manager 332 may output a status message periodically indicating the number of data rows that have been successfully migrated.

In at least one embodiment, background process 336 migrates data rows sequentially, in native sequence. Native sequence is intended to mean a preferred order for the data rows. Often, the preferred order is selected (e.g., by a DBA or designer of the database) based on the most likely processing sequence of the data rows. For example, if requests are typically made in a particular order, then the performance of the database may be increased if data is stored in the dataset in the same order as the most common user requests and/or batch utility requests. It should be noted that, when migrating in native sequence, data rows may be selected across multiple blocks of storage in source dataset 342A. For example, the first 4K block may contain the first data row to migrate, the second 4K block may contain the second data row to migrate, the fifth 4K block may contain the third data row to migrate, and so on. In other embodiments, background process 336 may migrate the data rows based any other desired order based on particular implementations and needs. For example, a new native sequence may be established during the migration. In this scenario, additional processing may be needed to replace the current key values associated with the data rows in the source dataset or to associate new, additional key values to each data row to indicate the new native sequence.

Figure 3F:
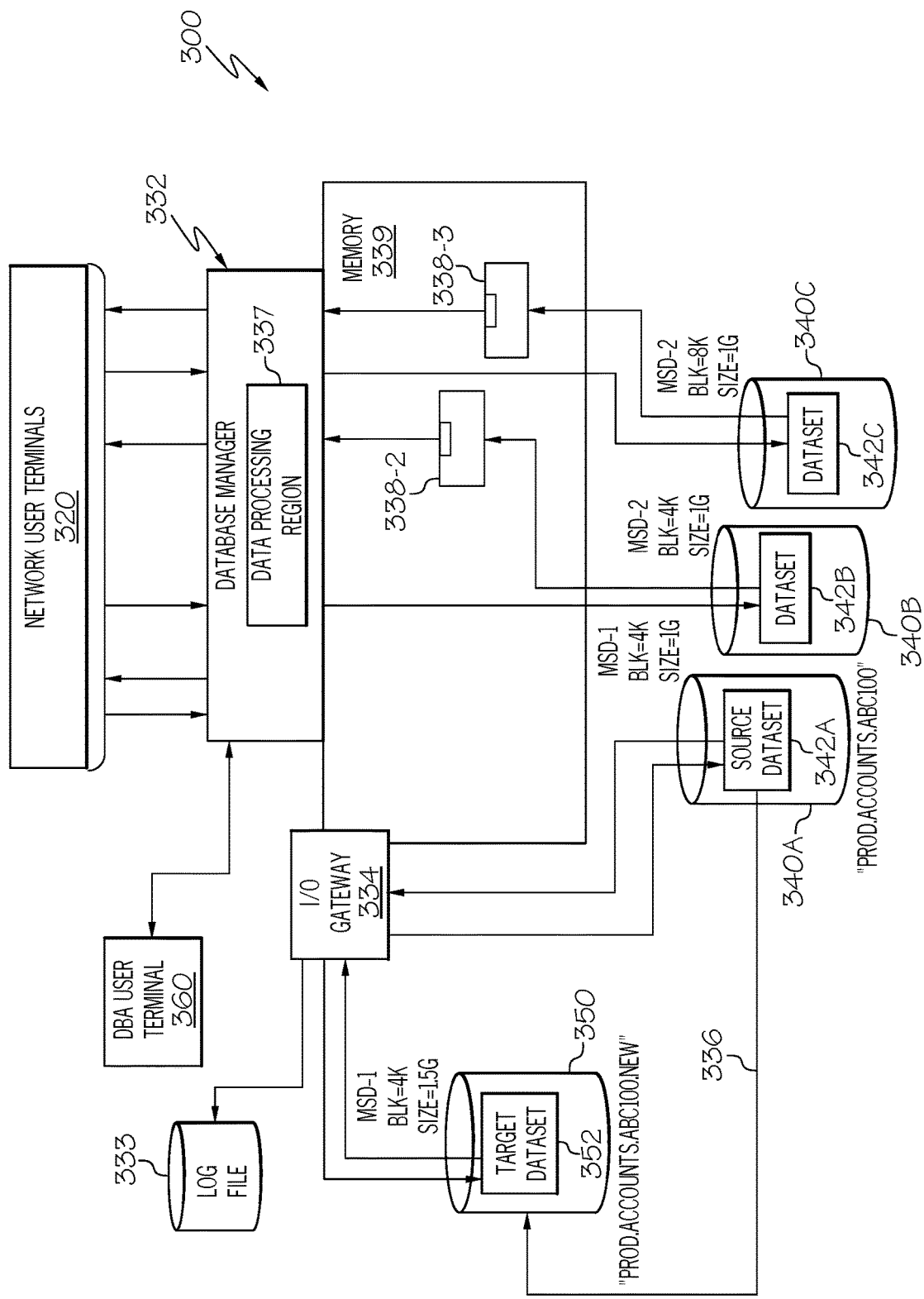

As shown in FIG. 3F, I/O gateway 334 may also create a log file 333 during the migration. I/O gateway 334 can store information in the log file that is related to each successful data row migration. Log file 333 may be used to restart the dataset reorganization process and the migration at the point of the last logged data row migration after a failure (e.g., power outage, system failure, etc.) that causes the dataset reorganization process to cease running. If an active data block in memory is partially filled with data rows being migrated when the failure occurs, such that the migrated data rows in that active data block have not been saved in the target dataset, then I/O 334 can use the log file to help recreate the active data block in memory so that the data migration can resume from the point at which the failure occurred.

In many scenarios, it is desirable to perform the migration as quickly as possible. Therefore, in at least one embodiment, as background process 336 performs the data migration, any available processing power may be used to migrate the data. However, some processing power is also allocated to end user requests for data in source dataset 342A. The user requests are directed through I/O gateway 334 so that the users can access any desired data row from source dataset 342A during the dataset reorganization process of source dataset 342A.

Figure 3G:
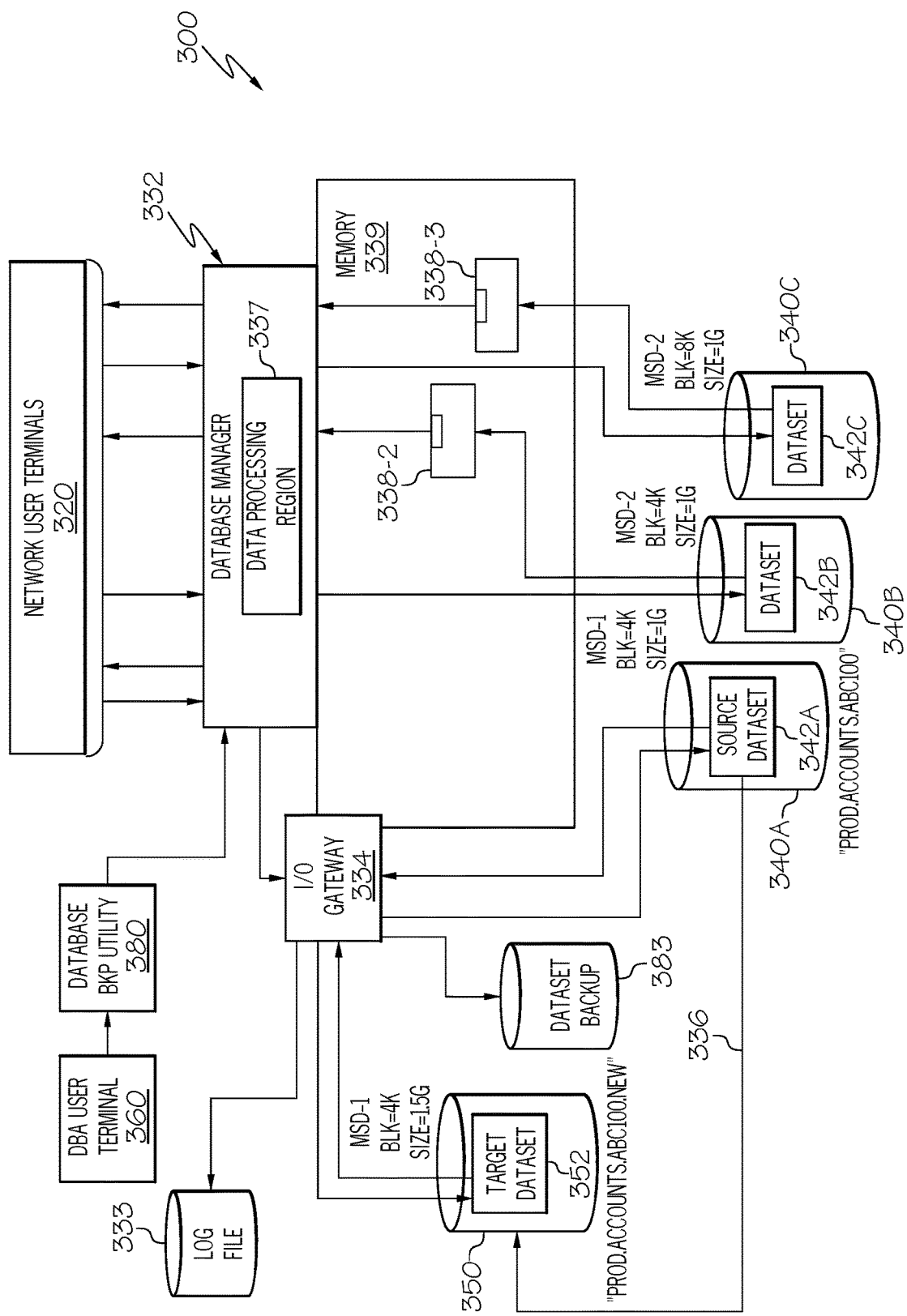

FIG. 3G illustrates a scenario that may occur during the dataset reorganization process. In some cases, certain utility applications and other non-end user processes may be initiated during the migration. For example, a DBA may decide that a database backup utility process cannot wait until the dataset reorganization process is finished. For example, a DBA may send a request, via DBA user terminal 360, to database manager 332 to run database backup utility application 380. Because a physical backup process of a dataset cannot be run during its data migration, the database backup utility application 380 is prevented from executing.

In at least one embodiment, upon receiving a request to run database backup utility application 380, database manager 332 may send a response to DBA user terminal 360 denying the request and offering to run an alternative backup utility application within I/O gateway 334 during the data migration. If the DBA agrees to the alternative backup application, database manager 332 can instruct I/O gateway 334 to run the alternative database backup utility application. The alternative database backup utility application is integrated with the I/O gateway 334 such that data rows are provided to the integrated application from the I/O gateway, which has access to both datasets 342A and 352. Thus, the I/O gateway controls and coordinates the backup process with the data migration so that an accurate backup can be performed. The integrated application can store the data rows received from the I/O gateway in another data storage device, such as dataset backup 383. Database manager 332 may provide status messages related to the alternative backup utility process.

Figure 3H:
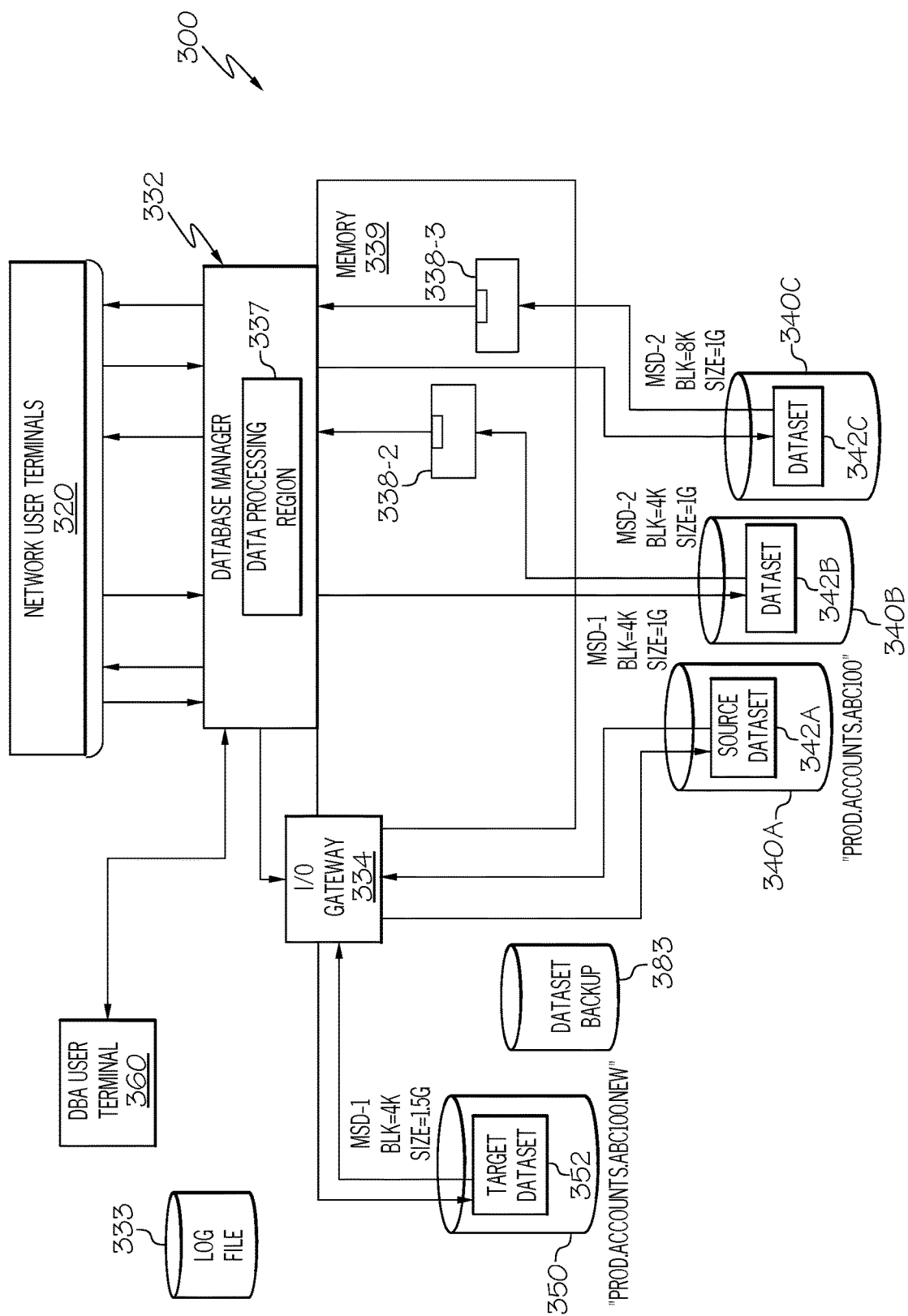

FIG. 3H illustrates the database environment once the data migration is completed. When every data row of source dataset 342A has been migrated to target dataset 352, then background process 336 ends. I/O gateway 334 may stop storing information in log file 333. Once the background process ends, however, I/O gateway 334 remains connected to source dataset 342A and target dataset 352 and continues to manage user requests for the data tables that are now stored entirely on target dataset 352. Database manager 332 may output a status message stating the number of data rows that have been successfully migrated and indicating that the data migration is completed.

Figure 3I:
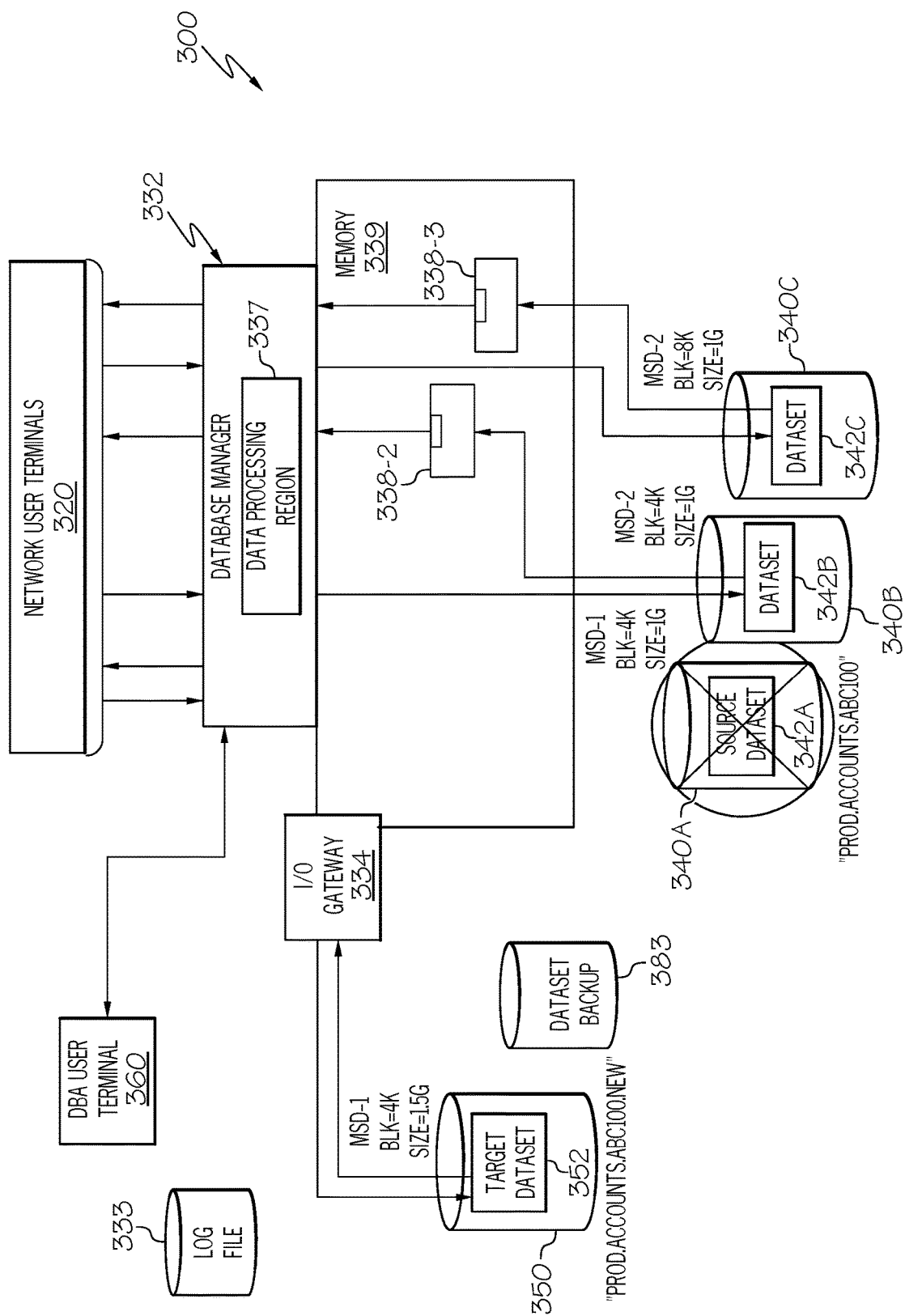

After the migration is completed, I/O gateway 334 can be disconnected from source dataset 342A, as shown in FIG. 3I. In at least one embodiment, background process 336 may cause the I/O gateway 334 to disconnect from source dataset 342A after the migration is completed, but before the background process ends. The original name associated with source dataset 342A is released (either by deleting or renaming the source dataset) so that the target dataset can be renamed to the original name (i.e., PROD.ACCOUNTS-.ABC100). In at least one embodiment, data processing region 337 can delete or rename source dataset 342A.

Database manager 332 can output a status message indicating that the old dataset (i.e., source dataset 342A) has been deleted or renamed.

Figure 3J:
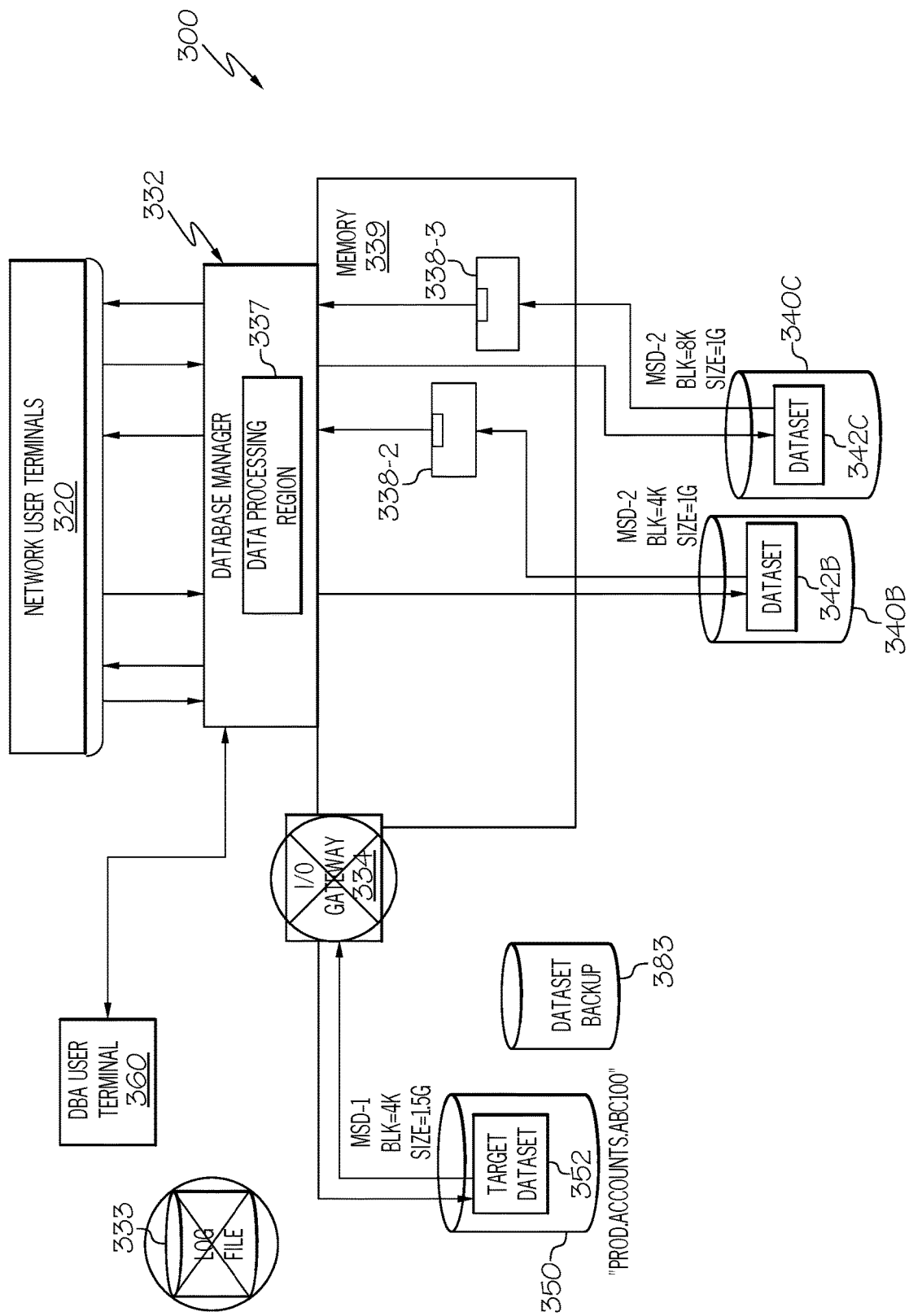

FIG. 3J shows the additional cleanup that is performed once the data migration is finished. First, the background process may rename target dataset 352 to the original name of source dataset 342A, which is now deleted or renamed. In this example scenario, target dataset 352 is renamed to PROD.ACCOUNTS.ABC100. Next, I/O gateway 334 can be stopped or removed and normal processing through data processing region 337 can resume. In at least one embodiment, database manager 332 may remove I/O gateway 334. In one example, log file 333 can be deleted, either by I/O gateway before it is removed, or by database manager 332. Database manager 332 can output a status indicating that the target dataset name has been changed to the original source dataset name, that the target dataset has an increased capacity (e.g., 1.5 G), and that the process is completed.

Figure 3K:
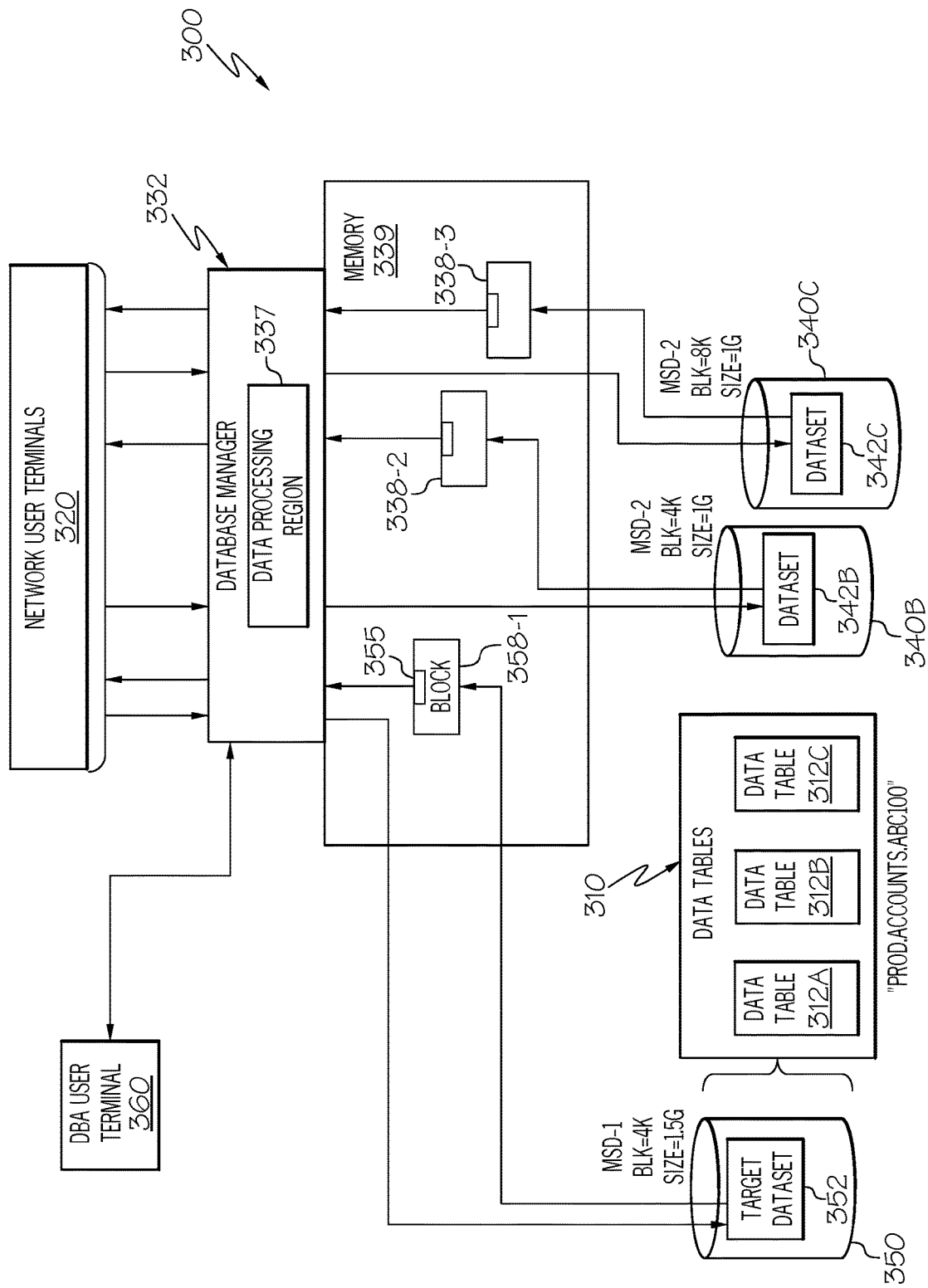

FIG. 3K illustrates the database environment after the dataset reorganization process is completed. Target dataset 352 contains data tables 310 and has the original file name of the source dataset that was migrated to the target dataset. Target dataset 352 is accessed by data processing region 337 when a user request (or utility application request) is received for a data row contained in target dataset 352. Data processing region 337 locates the requested data row 355 and retrieves a block 358-1 (e.g., 4K in this scenario) that contains requested data row 355. The block is loaded into a buffer in memory 339 and data row 355 can be provided to the appropriate user terminal.

Turning to FIGS. 4A-11, various flowcharts illustrate example techniques related to one or more embodiments of a communication system, such as communication system 100, for dynamically reorganizing a source dataset (e.g., 242) of a source storage device (e.g., 240) using online migration while allowing concurrent user access to the dataset. The architecture (e.g., storage device type, block size, etc.) of a target dataset (e.g., 252) in a target storage device (e.g., 250) can be defined as having the same block size as a source dataset (e.g., 242). The capacity of the target dataset may be the greater than, less than, or equal to the capacity of the source dataset. Data of the source dataset (e.g., 242) is migrated to the target dataset, without interrupting the user access (or utility application access) to data rows of data tables stored in the source dataset. In at least one embodiment, one or more sets of operations correspond to activities of FIGS. 4A-11. A network server, such as network server 230, or a portion thereof, may utilize the one or more sets of operations. In an embodiment, at least some operations of the flows of FIGS. 4A-11 may be performed by database manager 232 and at least some operations may be performed by I/O gateway 234 and background process 236. Network server 230 may comprise means such as processor 237, I/O controller 235, and memory element 239 for performing the operations.

Figure 4A:
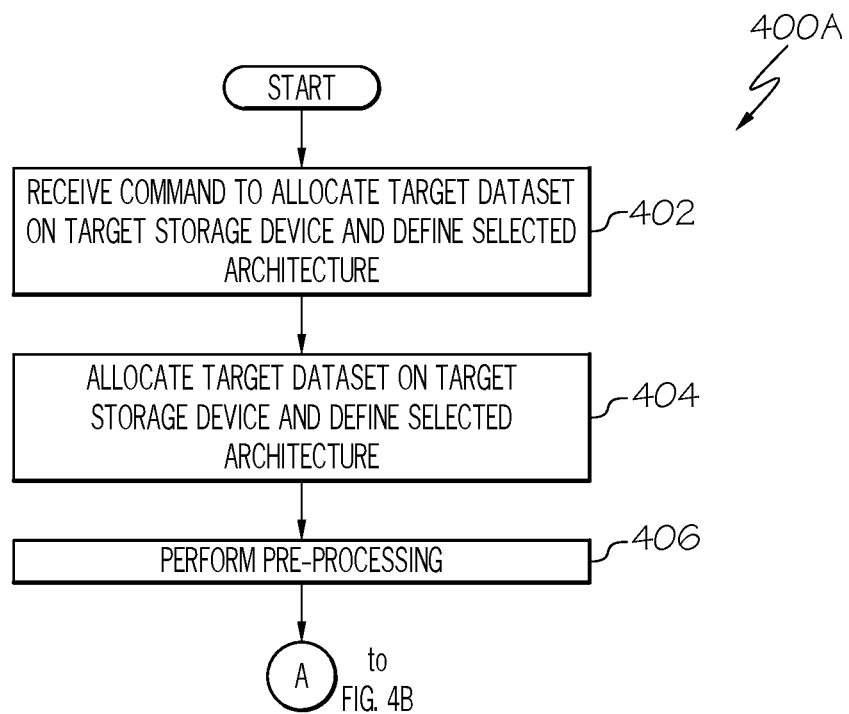
FIGS. 4A-4B are simplified flowcharts related to dynamically reorganizing a source dataset to a target dataset using online migration and allowing concurrent user access according to at least one embodiment.
Figure 4B:
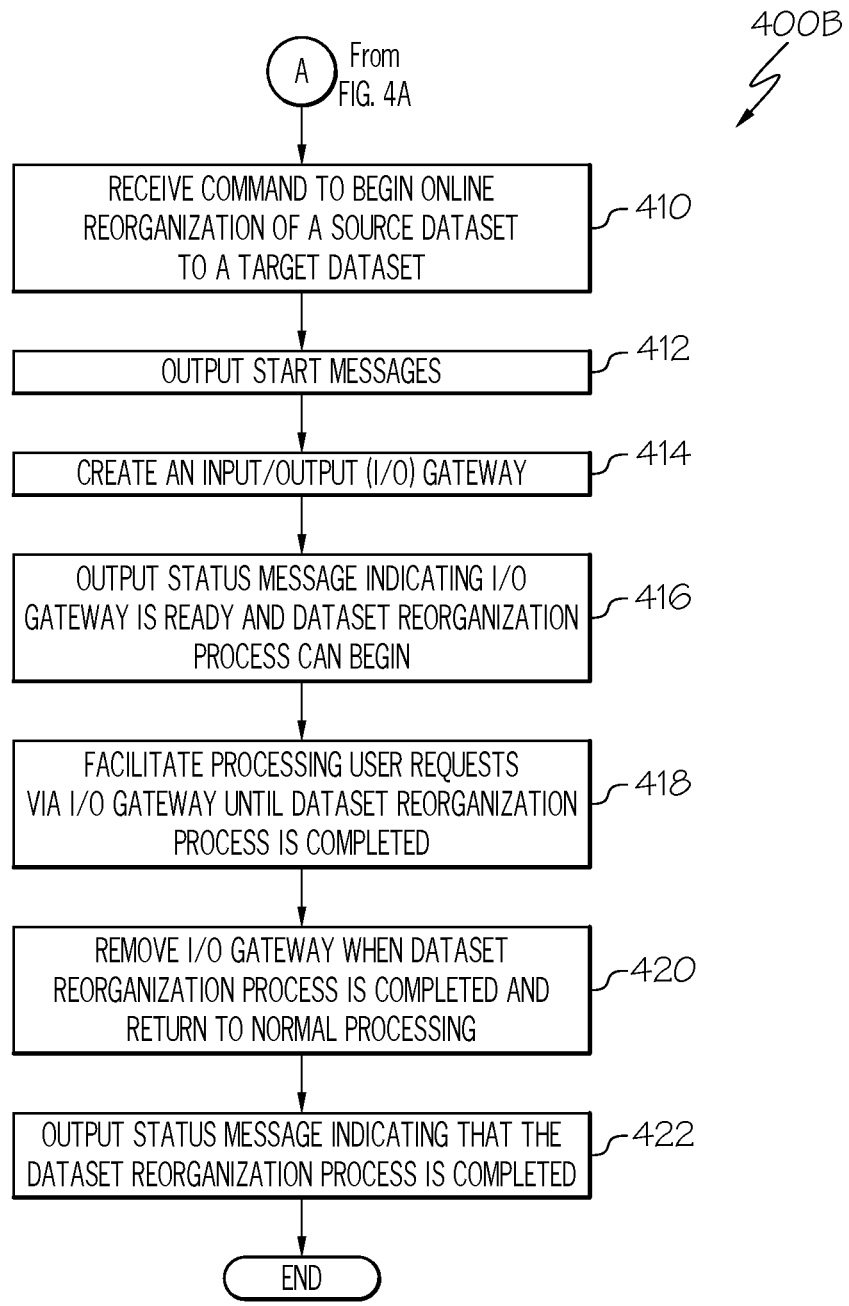

FIGS. 4A-4B are simplified flowcharts 400A and 400B, respectively, illustrating some operations that may be performed by database manager 232 to prepare physical storage devices and processes to reorganize a source dataset, such as source dataset 242. At 402, database manager 232 receives a command to allocate a target dataset on a target storage device and to define the selected architecture for the target dataset. For example, the selected architecture may be the same storage device type (e.g., IBM 3390) and the same block size (e.g., 4K, 8K, 18K, 27K, etc.) as the storage device type and block size currently defined for the source dataset. Although the target storage device could potentially be a different device type than the source storage device, generally, it is more efficient to use the same storage device type.

At 404, a target dataset is allocated on the target storage device, such as target dataset 252 on target storage device 250, and the selected architecture is defined for the target dataset. To resize the source dataset, the capacity of the target dataset may be allocated with a greater or lesser capacity than the capacity of the source dataset. In other scenarios, the target dataset may be allocated with a capacity that is equal to the capacity of the source dataset.

At 406, pre-processing tasks may be performed before the dataset reorganization process begins. For example, pre-processing tasks may include verifying the presence of the target storage device and target dataset, initializing the target dataset to the appropriate database internal format, verifying the presence of the source storage device and source dataset, and the overall readiness of the source and target datasets for the migration.

In FIG. 4B, at least some of the operations shown may be performed by database manager 232. At 410, a command may be received (e.g., from a DBA via a DBA user terminal) to begin the online reorganization process of a source dataset 242 by migrating source dataset 242 to target dataset 252 in native sequence.

At 412, the database manager can output start messages to indicate the dataset reorganization process has been initiated. Messages may be sent to a display and/or a log file of messages during the dataset reorganization process. The display may be, for example, a display device of a DBA user terminal or any other display device configured to receive messages from database manager 232.

At 414, database manager 232 can build or create an input/output (I/O) gateway, such as I/O gateway 234 to run in the same processing region or a separate processing region. I/O gateway can open source dataset 242 and target dataset 252 and establish connections to the datasets.

I/O gateway 234 is created to reorganize the source dataset, but not other datasets. Thus, I/O gateway 234 handles only user requests and possibly utility application requests for data rows stored in the gateway's associated source dataset. In at least one embodiment, I/O gateway is temporary and is removed when the dataset reorganization process completes. In other embodiments, I/O gateway 234 may be stopped, stored, and retrieved for later use as an I/O gateway for another source dataset.

When I/O gateway 234 establishes connections to source dataset 242 and target dataset 252, database manager 232 can output a status message at 416 indicating that the I/O gateway is ready, and the dataset reorganization process can begin.

At 418, database manager 232 can provide user requests for data in source dataset 242 to I/O gateway 234 and can receive and appropriately forward responses to those requests from the I/O gateway 234, until the dataset reorganization process is completed. An example of this processing is discussed in further detail with reference to FIG. 6. Database manager 232 can also handle any database utility process requests, including batch process requests and other non-end user process requests. These scenarios are discussed in further detail with reference to FIG. 10.

At 420, once the dataset reorganization process is completed, the database manager 232 can remove the I/O gateway, establish a connection to the target dataset including opening the target dataset, and return to normal processing. Normal processing includes receiving and responding to user requests for data rows in the target dataset by accessing the target dataset, locating the appropriate data rows, and loading the appropriate blocks of the target dataset into memory. Normal processing also includes allowing utility processes that request access to the target dataset to run. At 422, database manager 232 can output a status message indicating that the dataset reorganization process is completed.

Figure 5A:
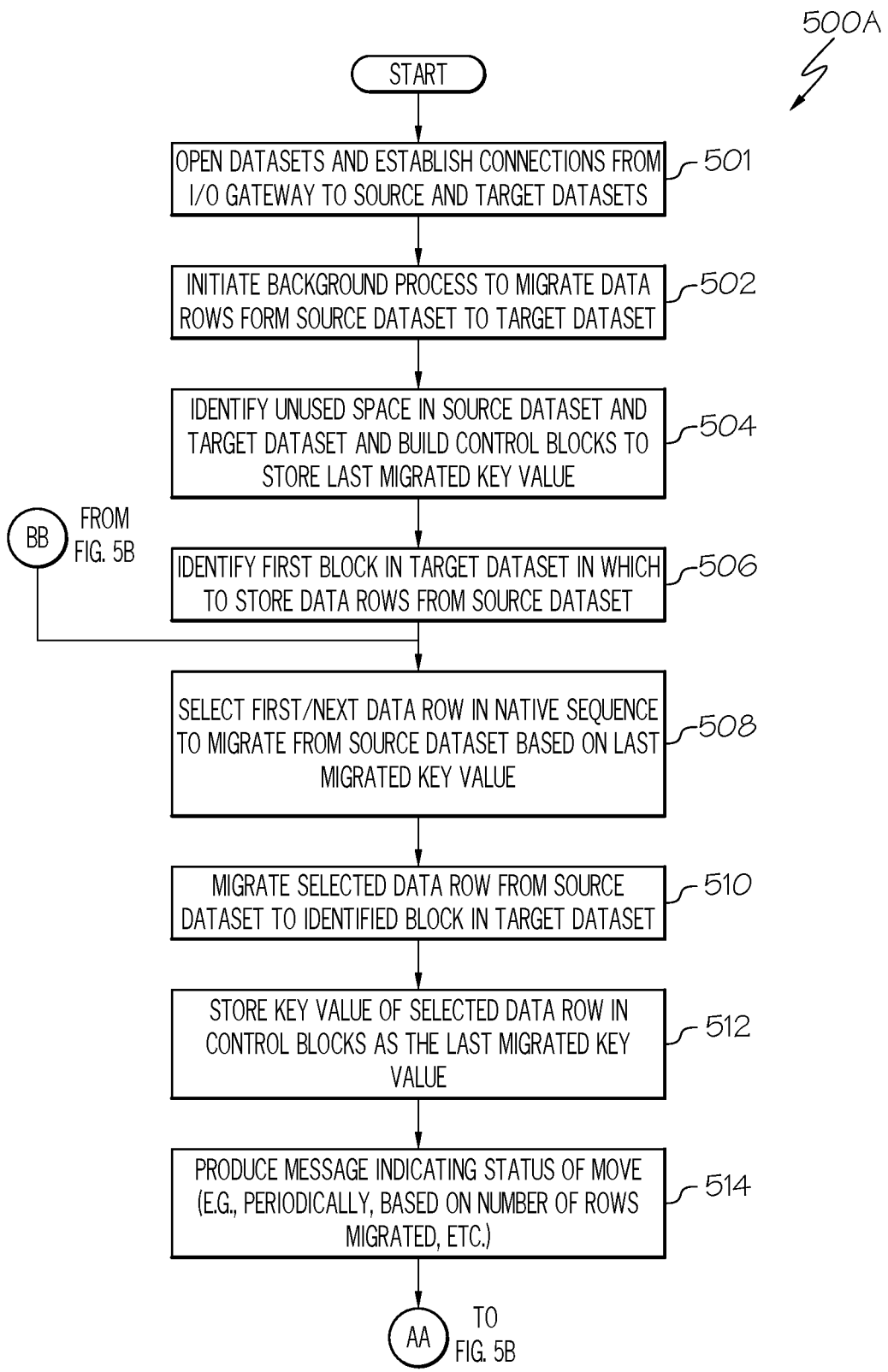
FIGS. 5A-5B are simplified flowcharts related to migrating data rows from a source dataset to a target dataset in the communication system according to at least one embodiment.
Figure 5B:
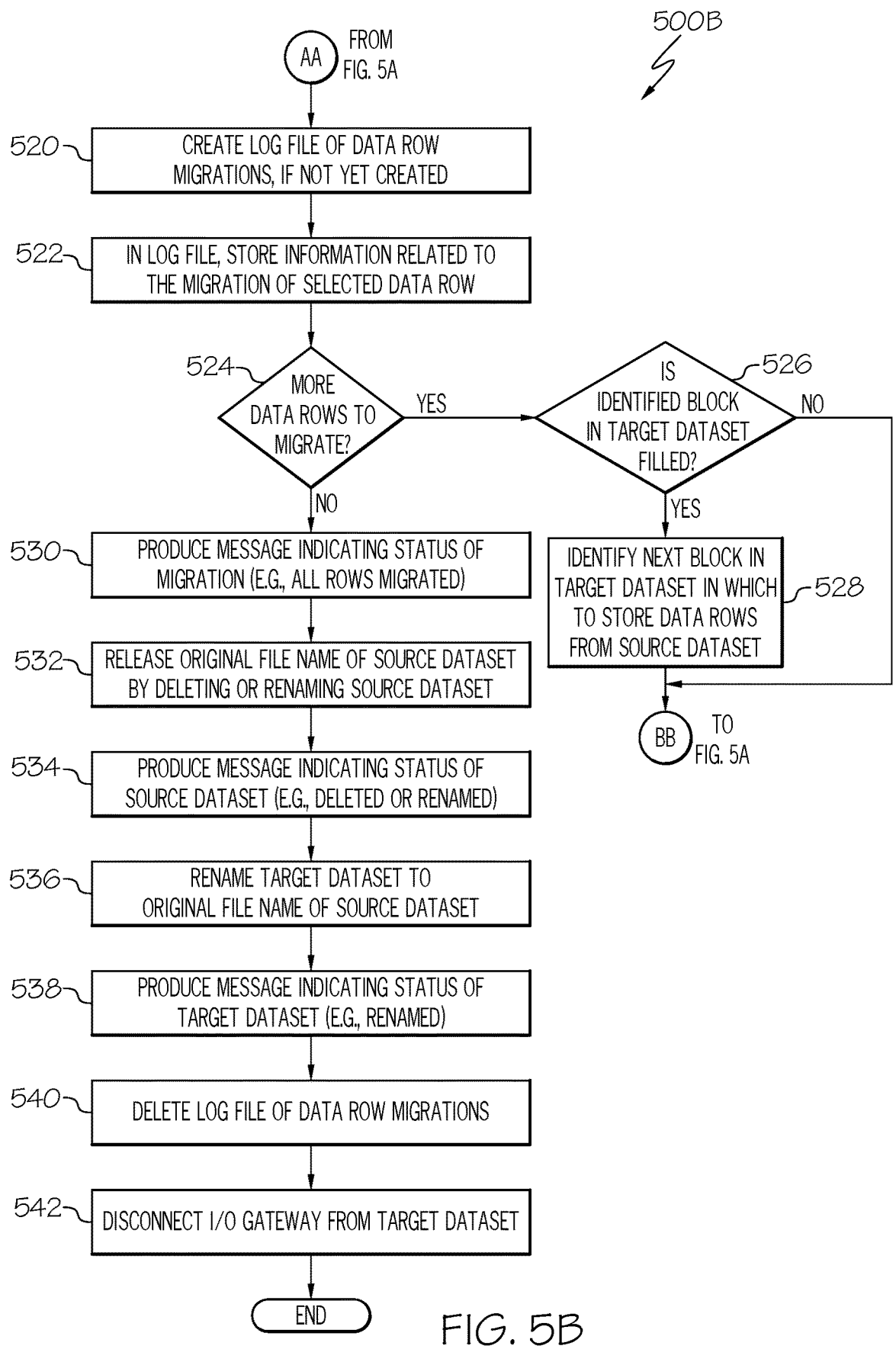

FIGS. 5A-5B are simplified flowcharts 500A and 500B, respectively, illustrating at least some of the activities that may be performed by I/O gateway 234 during the reorganization of source dataset 242. In at least one embodiment, flowchart 500A begins after database manager 232 has created the I/O gateway to reorganize source dataset 242.

At 501, I/O gateway 234 opens source dataset 242 and target dataset 252. I/O gateway 234 also establishes connections to the source and target datasets.

At 502, I/O gateway 234 can initiate a background process to migrate data rows from source dataset 242 to target dataset 252.

At 504, unused space is identified in both the source dataset 242 and the target dataset 252. A control block can be built on both the identified unused space in the source dataset and the identified unused space in the target dataset. The control blocks can be used to store a last migrated key during the migration of data rows from the source dataset to the target dataset. In one embodiment, each row has a unique key value, and the key values correspond to the native sequence of the data rows. The migration of the data rows is performed sequentially based on the unique key values.

Over time, data rows in a dataset may become out-of-native-sequence due to modifications to the data rows (e.g., insertions, deletions). In order to migrate the data rows of source dataset 242 in native sequence, the rows may be selected for migration based on each row's native key value. Thus, the migration can effectively reorder the data rows into a native key sequence in target dataset 252.

At 506, the first block in which data rows are to be stored in target dataset 252 is identified. This identified block is the "active" block until it has been filled with migrated data rows and stored in the target dataset. This active block has the same block size as data blocks in the source dataset. At 508, the first data row to migrate from the source dataset is selected. The data row may be selected based on the last migrated key. Because no data rows have been migrated yet, the value of the last migrated key may be null or zero in one example. Therefore, in this example, the first data row could be selected based on its associated key value being the first (e.g., lowest) key value in a sequence of all the key values associated with the data rows in source dataset 242. The key values can be based on a native sequence of the data rows. It should be apparent that in some implementations data rows may be migrated from the lowest key value to the highest key value, and in other implementations, the data rows may be migrated from the highest key value to the lowest key value. Essentially, any desired ordering scheme may be used to establish a native sequence for data rows, and the data rows can be migrated according to the established native sequence.

At 510, the selected data row is migrated from source dataset 242 to the identified block in target dataset 252. In at least one embodiment, the identified (or active) block may not be written to the target dataset until it has been filled with migrated data rows from the source data set. At 512, the key value associated with the migrated data row is stored in the control blocks in both the source dataset and the target dataset as the last migrated key value. The last migrated key value stored in the control blocks provides a reference to enable identification of which data rows have been migrated at any given time during the migration. For example, the last migrated key value stored in the control blocks can indicate that the data row associated with the last migrated key value, and any other data rows associated with key values that are less than the last migrated key value, have been successfully migrated.

At 514, a message indicating the status of migration may be produced. Status messages may include the number of rows successfully migrated in one example. These messages may not be produced after every data row migration, but rather, may be produced periodically (e.g., 10,000 data rows migrated, 20,000 data rows migrated, etc.). In one embodiment, this message or information can be provided to database manager 232, which can then output the message to an appropriate display or log file of status messages.

At 520, in FIG. 5B, I/O gateway 234 can create a log file of data row migrations, if not already created. At 522, information can be stored in the log file that is related to the migration of the selected data row. Relevant information is saved for each successful data row migration to enable restartability and recoverability if the network server (or components within the network server) should experience some failure that crashes or otherwise interrupts the dataset reorganization process. Information may include, but is not necessarily limited to, the key value of the selected data row, the location of the selected data row in the target dataset, and/or the location of the selected data row in the source dataset.

At 524, a determination is made as to whether there are more data rows in source dataset 242 to be migrated. If there are more data rows to be migrated, then at 526, a determination is made as to whether the identified block in target dataset 252 is filled. If the identified target data block is filled and has been stored in the target dataset, then at 528, a next block in the target dataset is identified to store with more data rows from the source dataset. The new target data block may be allocated as the active block in buffer memory to begin receiving data rows that have not yet been migrated from the source dataset.

If the next block in the target dataset is identified at 528, or if the currently-identified block in the target dataset is determined not to be filled at 526, then the flow loops back to 508, where the next data row is selected to migrate from source dataset 242 to target dataset 252. The last migrated key value is retrieved from the control block of the source dataset or the target dataset. In the first time through the flow shown in 500B, the last migrated key value stored in the control block is the key value associated with the first selected data row. The next data row to select at 508 is identified by determining the next sequential key value of a data row in the source dataset. For example, the next sequential key value may be the next higher key value or the next lower key value (depending on the implementation) than the last migrated key value stored in the control block of the target dataset and/or the source dataset.

Flow then continues in this loop as previously described until eventually, at 524, it is determined that the source dataset contains no more data rows to be migrated. I/O gateway 234 may disconnect from source dataset 242 but retain its connection with target dataset 252. At 530, a message is produced indicating the status of the migrated data rows. In at least one embodiment, information indicating the total amount of data rows that have been migrated may be provided to database manager 232. Database manager 232 may then output the status message to the appropriate display and/or log file of status messages.

Operations at 532-542 are related to enabling database manager to resume normal operations with target dataset 252 replacing source dataset 242 in the database environment. In some cases, one or more operations at 532-542 may be performed by I/O gateway 234, database manager 232, background process 236, and/or other background processes initiated for these activities.

At 532, the original file name of source dataset 242 is released by either deleting or renaming the source dataset. At 534, a message may be produced indicating the status of the source dataset (e.g., deleted or renamed). In at least one embodiment, information indicating the status of the source dataset may be provided to database manager 232. Database manager 232 may then output the status message to the appropriate display and/or log file of status messages.

At 536, target dataset 252 is renamed to the original file name of the source dataset. At 538, a message may be produced indicating the status of the target dataset (e.g., renamed to original file name of source dataset). In at least one embodiment, information indicating the status of the target dataset may be provided to database manager 232. Database manager 232 may then output the status message to the appropriate display and/or log file of status messages.

At 540, the log file of data row migrations may be deleted by I/O gateway 234. In other embodiments, the log file of data row migrations may be deleted after the I/O gateway has stopped running (e.g., by database manager 232), or may be saved for any desired length of time.

At 542, I/O gateway 234 is disconnected from the target dataset and the I/O gateway stops handling user requests or utility process requests for the target dataset. As indicated in FIG. 4B at 420, processing returns to normal for accessing the data tables, which are now stored on target dataset 252. The database manager can establish a connection to the target dataset and user requests to the target dataset can be handled by data processing region of the database manager.

Figure 6:
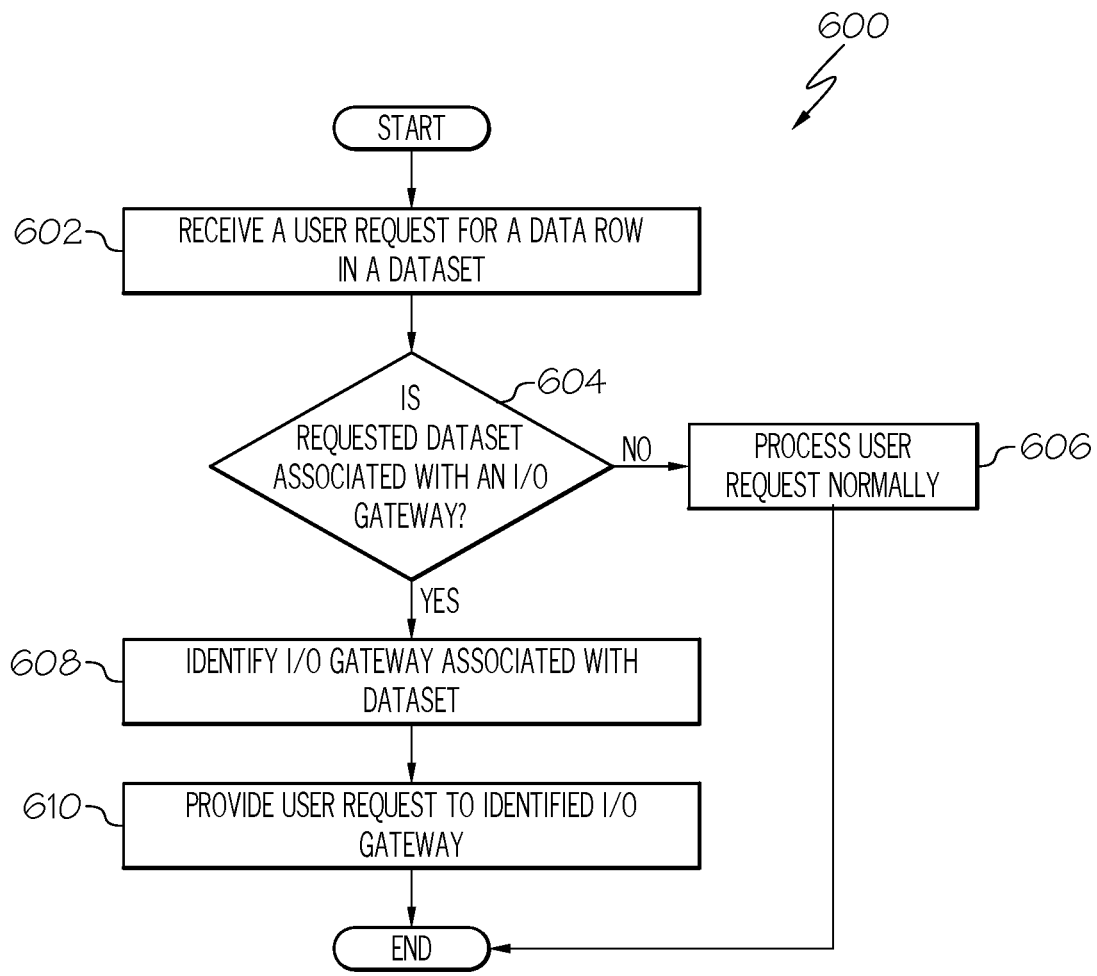
FIG. 6 is a simplified flowchart related to receiving user requests for access to data rows in datasets in the communication system according to at least one embodiment.

FIG. 6 is a simplified flowchart 600 illustrating at least some of the activities that may be performed by database manager 232 while the I/O gateway 234 is running. It should be noted that the I/O gateway 234 created to reorganize source dataset 242 may be one of multiple I/O gateways created for multiple datasets, respectively, of the database associated with network server 230.

At 602, a user request for access to a data row in a dataset is received. At 604, a determination can be made as to whether the dataset is associated with an I/O gateway. A dataset is associated with an I/O gateway if the dataset is being reorganized by the I/O gateway.

If the requested dataset is not associated with an I/O gateway, then at 606, the user request is processed normally. For example, the user request may be handled through a data processing region created by database manager 232, as shown in FIGS. 3A-3K for requests to datasets 340B and 340C.

If the requested dataset is associated with an I/O gateway, then at 608, the database manager identifies the I/O gateway that is associated with the dataset. At 610, database manager 232 provides the user request to the identified I/O gateway. Thus, database manager 232 receives user requests and funnels them to the appropriate I/O gateway (if any) to allow the I/O gateway to manage user requests received during the migration and reorganization of data from source dataset 242 to target dataset 252. This process may continue as long as at least one I/O gateway is still running in the database environment.

Figure 7A:
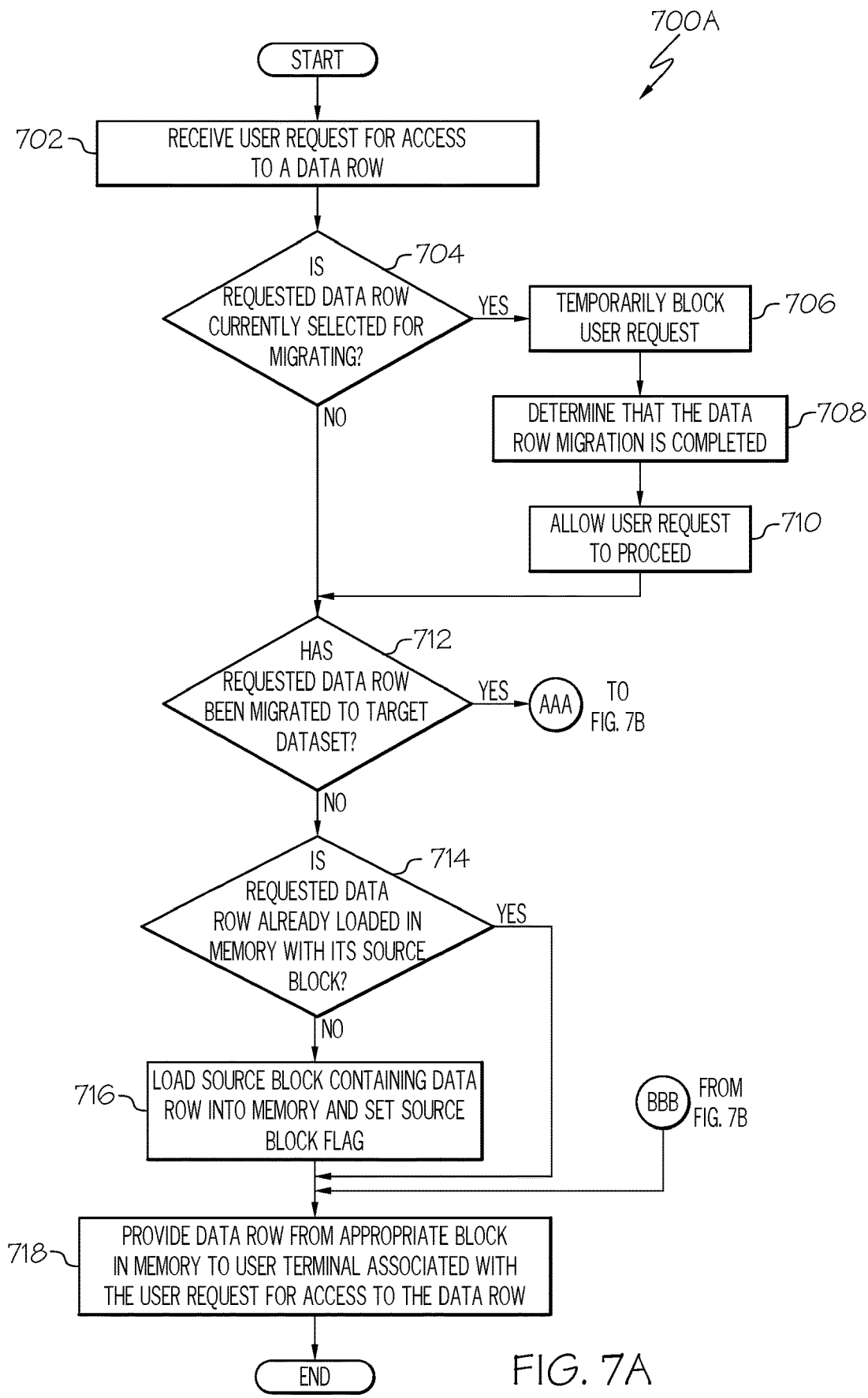
FIGS. 7A-7B are simplified flowcharts related to managing user requests to access a dataset during a migration of the dataset in the communication system according to at least one embodiment.
Figure 7B:
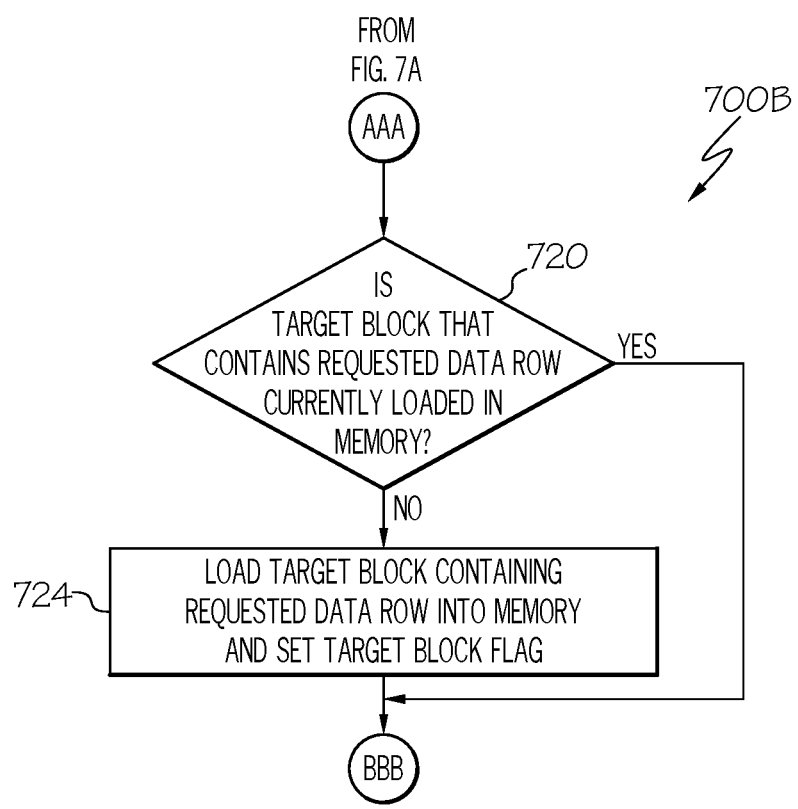

FIGS. 7A-7B are simplified flowcharts 700A and 700B, respectively, illustrating some operations that may be performed by an I/O gateway (e.g., 234) during a dataset reorganization process according to embodiments described herein. Flowcharts 700A and 700B relate to handling user requests for access (read) to data rows in a source dataset (e.g., 242) that are being migrated from the source dataset to a target dataset (e.g., 252) concurrently with the user requests, where the source data set and the target dataset are configured with the same block size. Access (or read) of a data row typically makes up the majority of user requests.

At 702, I/O gateway 234 receives a user request for access to a data row in source dataset 242 during the migration of its data rows to target dataset 252. At 704, a determination is made as to whether the requested data row is currently selected to be migrated. In some possibly rare scenarios, a user request for access to a data row may happen simultaneously with a background migration process (e.g., 236) selecting the same data row for migration. In this scenario, the user request may be briefly halted until the migration of the requested data row is completed. Accordingly, if the requested data row is currently selected for migrating, then at 706, I/O gateway 234 temporarily blocks the user request. At 708, a determination may be made that the data row migration is completed. At 710, once the data row migration is completed, the user request is processed by the I/O gateway.

At 712, a determination is made as to whether the requested data row has been migrated to the target dataset. In one example, the last migrated key value and the key value of the requested data row can be used to determine whether the requested data row has already been migrated. The last migrated key value can be obtained from a control block of either the source dataset or the target dataset. In one example implementation, if the key value of the requested data row is less than or equal to the last migrated key value, then the requested data row has already been migrated. Conversely, if the key value of the requested data row is greater than the last migrated key value, then the requested data row has not been migrated.

If the requested data row has not been migrated to the target dataset, then at 714, a determination is made as to whether the requested data row is currently in a buffer in memory. The requested data row may be in a buffer in memory with its source block if the data row was previously requested by a user request. The source block is the block of data in the source dataset that contains the data row. For example, if the dataset architecture of the source dataset is defined as 4K byte blocks, then a 4K byte block of data containing the requested data row may be stored in buffer memory if access to the data row or another data row in the same block was previously requested by a user.

In at least one embodiment, a source block flag (or any other suitable indicator) may be set for each block of the source dataset that is loaded into memory. In this example, at 714, the determination of whether the requested data row is already in memory can be made by determining whether a source block flag is set for the source block that contains the requested data row. If the source block flag is set, then the source block is in memory and therefore, the requested data row is in memory.

If the requested data row is not already loaded in buffer memory, then at 716, a block of data that contains the requested data row is located in the source dataset, retrieved by I/O gateway 234, and loaded into a particular area of memory used by I/O gateway. In addition, a source block flag associated with the source block may be set to indicate that the particular source block has been loaded into memory in response to a user request.

Once the source block containing the requested data row is loaded into memory, or if the source block containing the requested data row was already loaded in memory, at 718, the requested data row from the source block in memory is provided to a user terminal associated with the user request for access to the data row.

With reference again to 712, if the requested data row has already been migrated to target dataset 252, then flow passes to 720 of FIG. 7B. At 720, a determination is made as to whether the requested data row is already in a buffer in memory with the target block that contains the requested data row. The requested data row may be in a buffer in memory with a target block if the requested data row (or any other data row in the target block) was previously requested by a user request after the requested data row was migrated. For example, if the dataset architecture of the target dataset (and the source dataset) is defined as 27K byte blocks, then a 27K byte block of data containing the requested data row may be stored in buffer memory if access to the requested data row (or any other data row in this 27K byte block) was previously requested by a user after the requested data row was migrated.

In at least one embodiment, a target block flag (or any other suitable indicator) may be set for each block of the target dataset that is loaded into memory. In this example, at 720, the determination of whether the requested data row is already in memory can be made by determining whether a target block flag is set for the target block that contains the requested data row. If the target block flag is set, then the target block is in memory and therefore, the requested data row is in memory.

Even if the requested data row has not been previously requested, the requested data row may be loaded in memory if the target block containing the requested data row is "active." A target block is "active" if the target block is currently receiving and storing data rows being migrated. If a target block containing a requested data row is active, then the target block may not be filled to capacity and may still have additional space to receive data rows migrating from the source dataset. For example, the active target block may be partially filled (e.g., 20 data rows of 40 possible data rows are stored in the target block). If the I/O gateway receives a user request for access to a data row that has already been migrated and stored in this active target block, which is still in memory, then the user request is processed using this active target block in buffer memory that is already in place.

If the target data block that contains the requested data row is not currently loaded in buffer memory, as determined at 720, then at 724, the target data block containing the requested data row can be located and retrieved from target dataset 252 and loaded into buffer memory. In addition, a target block flag may be set to indicate that the particular target data block has been loaded into memory in response to a user request.

Once the target block that contains the requested data row is loaded in buffer memory, then flow can proceed to 718 in FIG. 7A. At 718, the requested data row from the target block in memory is provided to a user terminal associated with the user request for access to the data row.

Figure 8:
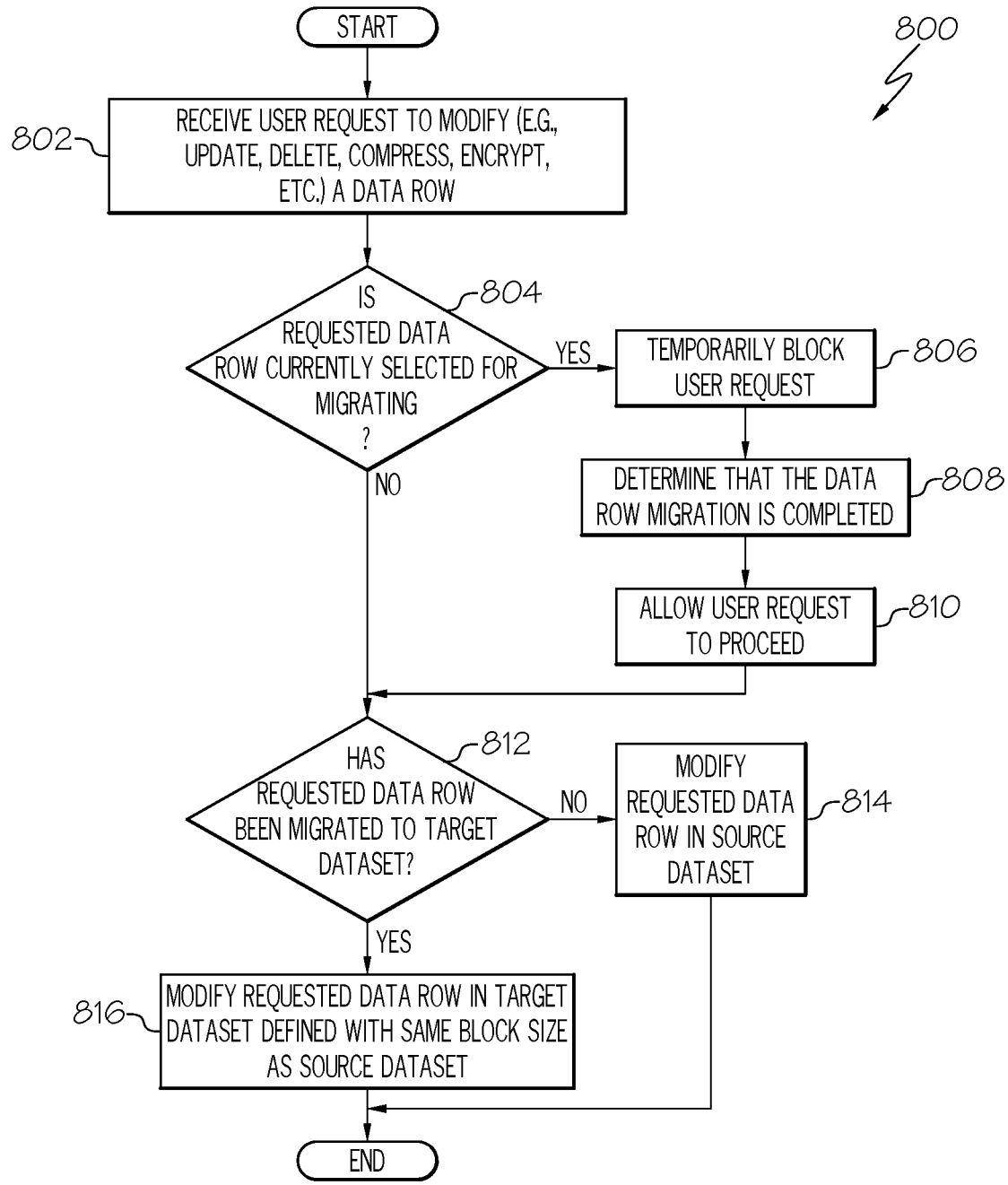
FIG. 8 is a simplified flowchart related to managing user requests to modify a dataset during a migration of the dataset in the communication system according to at least one embodiment.

FIG. 8 is a simplified flowchart 800 illustrating some operations that may be performed by an I/O gateway (e.g., 234) during a dataset reorganization process according to embodiments described herein. Flowchart 800 relates to handling user requests to modify data rows in a source dataset (e.g., 242) that are being migrated from the source dataset to a target dataset (e.g., 252) concurrently with the user requests, where the source data set and the target dataset are configured to have the same block size.

At 802, I/O gateway 234 receives a user request to modify a data row in source dataset 242. At 804, a determination is made as to whether the requested data row is currently selected to be migrated. In some possibly rare scenarios, a user request to modify a data row may happen simultaneously with the background migration process (e.g., 236) selecting the same data row for migration. In this scenario, the user request may be temporarily blocked until the requested data row has been migrated. Accordingly, if the requested data row is currently selected for migrating, then at 806, I/O gateway 234 temporarily blocks the user request. At 808, a determination may be made that the data row migration is completed. At 810, once the data row migration is completed, the user request is processed by the I/O gateway.

At 812, a determination is made as to whether the requested data row has been migrated to the target dataset. In one example, the last migrated key value and the key value of the requested data row can be used to determine whether the requested data row has already been migrated. The last migrated key value can be obtained from a control block of either the source dataset or the target dataset. In one example implementation, if the key value of the requested data row is less than or equal to the last migrated key value, then the requested data row has already been migrated. Conversely, if the key value of the requested data row is greater than the last migrated key value, then the requested data row has not been migrated.

If the requested data row has not been migrated from the source dataset to the target dataset, then at 814, the data row is modified in the source dataset based on user access to a source block in memory. The modification can be made based on the source block size in memory and in storage, because the block size of the source block loaded in memory (e.g., 4K) is the same as the block size defined for the source dataset in the source storage device (e.g., 4K). Modifications of data can include changing the content of the data row, deleting the data row, compressing or decompressing the data row, encrypting the data row, etc.

If the requested data row has already been migrated to the target dataset, as determined at 812, then at 816 the data row contained in a target block loaded in memory, which is the same block size as the block size defined for the source dataset (e.g., 4K) is updated using the target block loaded in memory. If the data row has been migrated, then the data row is modified in the target dataset using the target block loaded in memory even if the modification was requested by a user based on the user accessing the data row via a source block of the source dataset that is loaded in memory.

The internal processing of the user modification request for a data row in the source or target data block size is completely transparent to the user. The database manager in concert with the I/O gateway, manages all aspects of the data block size management and makes the process transparent to the end-user.

Figure 9:
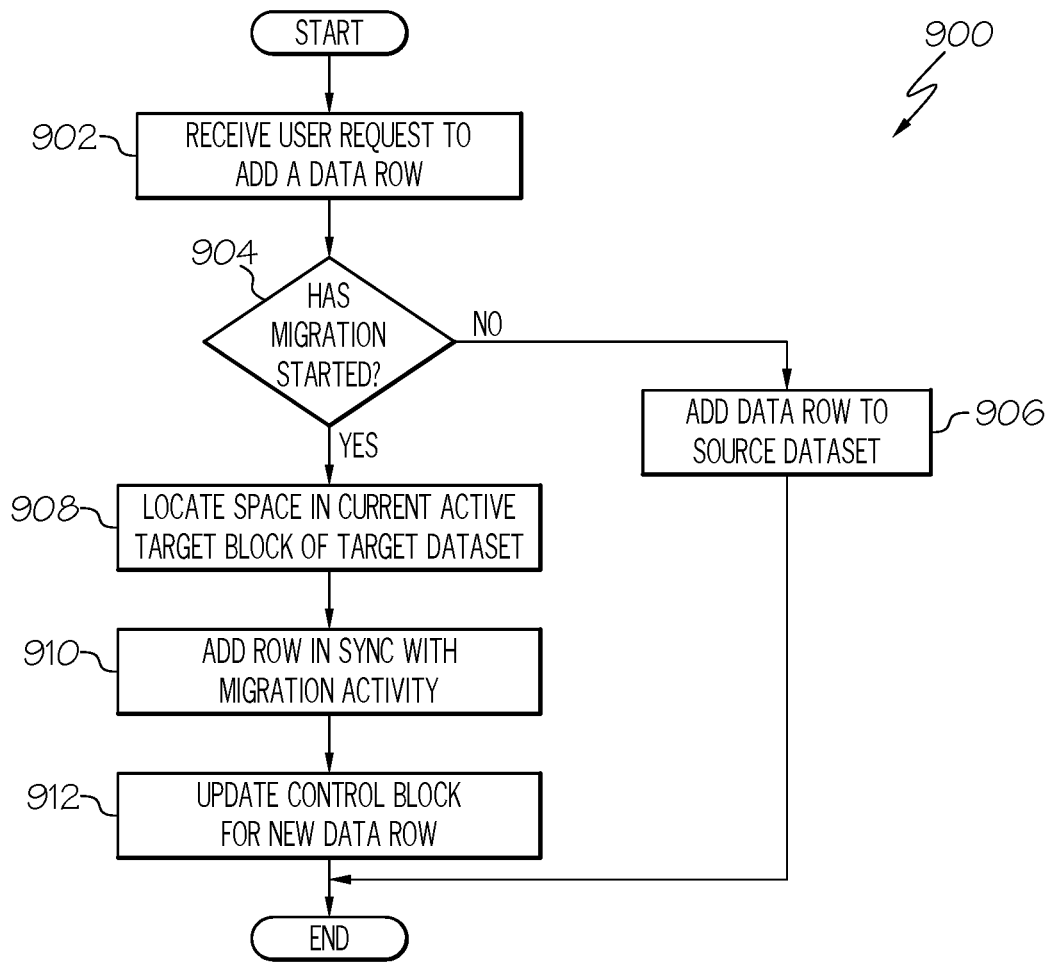
FIG. 9 is a simplified flowchart related to managing user requests to add a data row to a dataset during a migration of the dataset in the communication system according to at least one embodiment.

FIG. 9 is a simplified flowchart 900 illustrating some of the data add operations (new rows) that may be performed by an I/O gateway (e.g., 234) during a dataset reorganization process according to embodiments described herein. Flowchart 900 relates to handling user requests to add data rows to a source dataset (e.g., 242) after the migration process to migrate and reorganize the source dataset to a target dataset (e.g., 252) has been started. If a user request adds a data row once the migration process is started, the I/O gateway directs the addition of the new row to the target dataset. (e.g., 252).

This insures that new rows can be added concurrently with the migration process. New rows may be added to the first available space in the active target block. The placement of the new data row may be out of "perfect sequence" with the other data rows, but the small number of adds that typically occur would not substantially affect the overall data row sequence. New data rows that are added during the migration process are tracked by the I/O gateway and the control blocks so that a subsequent request to read or modify the new row (while the migration process is still active) will automatically be directed to the target dataset.

At 902, I/O gateway 234 receives a user request to add a new data row in source dataset 242. At 904, a determination is made as to whether the migration process has been started. If it has not started, then at 906, the data row is added to the source dataset following normal processing procedures.

If the migration process has begun, then at 908, the I/O gateway 234 directs the addition of the new row to the target dataset 252. The I/O gateway 234 finds space in the current active target block and memory for the new data row.

At 910, the new data row is added to the located space in the current active target block and memory. The addition of the new data row by the I/O gateway 234 is synchronized with the migration activity. Synchronizing data row additions with migration activity allows concurrent migrations with data row additions. The key value assigned to the new data row can be based on the native sequence of the data rows.

At 912, the migration control block may be updated (e.g., by a key value associated with the newly added data row) so that any future access requests for this new data row will be directed to the target dataset 252. The last migrated key value stored in the control block, however, may be left unchanged in at least one embodiment so that the next key value in the native sequence can be determined and used to select the next data row to be migrated.

Figure 10:
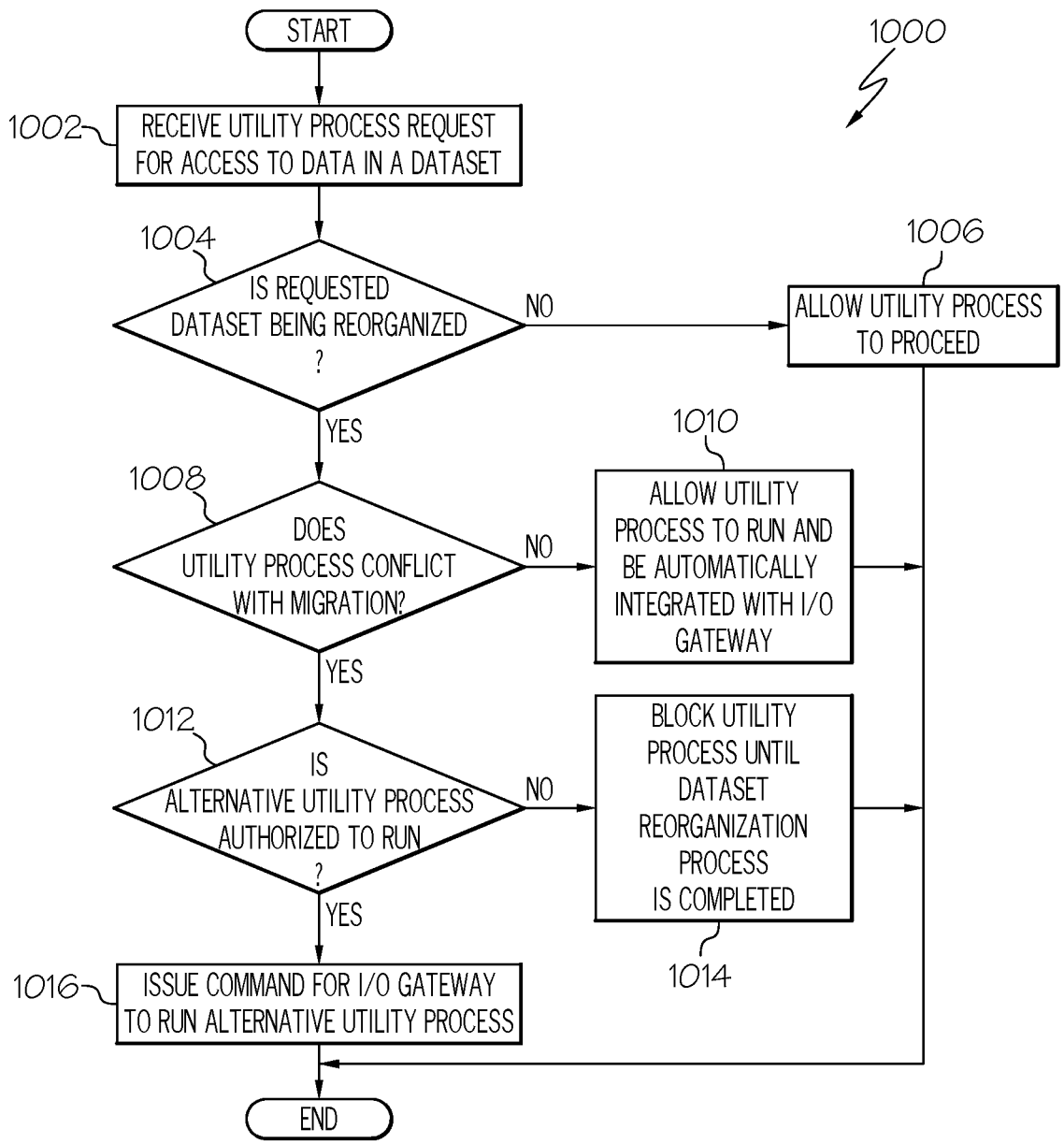
FIG. 10 is a simplified flowchart related to managing a utility process request during a migration of a dataset in the communication system according to at least one embodiment.

FIG. 10 is a simplified flowchart 1000 illustrating some operations that may be performed by a database manager (e.g., 232) during a dataset reorganization process according to embodiments described herein. Flowchart 1000 relates to handling requests from utility processes (e.g., database utility application processes, DBA-initiated processes, other non-end user processes, etc.) to access data rows that are being migrated from a source dataset (e.g., 242) to a target dataset (e.g., 252). In some scenarios, if a utility process request is received for a particular source dataset during a reorganization process of that source dataset, then a database manager (e.g., 232) may block the request. In some other scenarios, if a requested utility process does not conflict with the dataset reorganization process, then the I/O gateway associated with the dataset reorganization process may provide full integration of the utility process with the data row migration. For at least some utility processes, however, the database manager may provide an alternative process that can be integrated by the I/O gateway associated with the dataset reorganization process. In some embodiments, the database manager may send a request to an authorized user (e.g., DBA) to obtain permission to initiate the alternative process. In other embodiments, the database manager may initiate the alternative process automatically. In at least some embodiments, the database manager may issue the alternative process based on whether the alternative process has been pre-authorized to run automatically.

At 1002, a database manager 232 may receive a utility process request that requires access to data of a source dataset (e.g., 242) being reorganized. At 1004, database manager 232 determines whether the requested dataset is currently in a dataset reorganization process. If the requested dataset is not being reorganized, then at 1006, the utility process may be allowed to proceed.

If the requested dataset is currently in a dataset reorganization process, then at 1008, a determination is made as to whether the utility process conflicts with the migration. If the utility process is determined to not conflict with the migration, then at 1010, the utility process is allowed to run and is handled by the I/O gateway providing full integration with the data row migration.

If the utility process is determined to conflict with the migration, then at 1012, a determination is made as to whether an alternative utility process is available and authorized to run. Determining whether an alternative utility process is authorized to run can include, but is not limited to, requesting authorization from an authorized user (e.g., DBA) or determining whether running the utility has been pre-authorized.

If an alternative utility process is not available or is determined to not be authorized to run, then at 1014, the database manager may block the utility process until the dataset reorganization process is completed.

If an alternative utility process is available and authorized to run during a dataset reorganization process, then at 1016, the database manager can issue a command for I/O gateway 234 to run the alternative utility process.

An alternative utility process can be configured to allow the I/O gateway to integrate the alternative utility process with the background migration process. In one example, the alternative utility process issues requests to access data to the I/O gateway. The I/O gateway receives the utility process requests and, for each request, may use a process similar to flows previously described herein for data access requests (e.g., FIGS. 7A-7B), for data modification requests (e.g., FIG. 8), and/or for data addition requests (e.g., FIG. 9).

In another example, the I/O gateway may allow the alternative utility process to access data sequentially, as it is migrated to the target dataset. For example, if an alternative backup utility is run by the I/O gateway, then the I/O gateway may establish a connection to a backup storage device, and then provide the alternative backup utility with access to data rows after they are successfully migrated to the target dataset.

Figure 11:
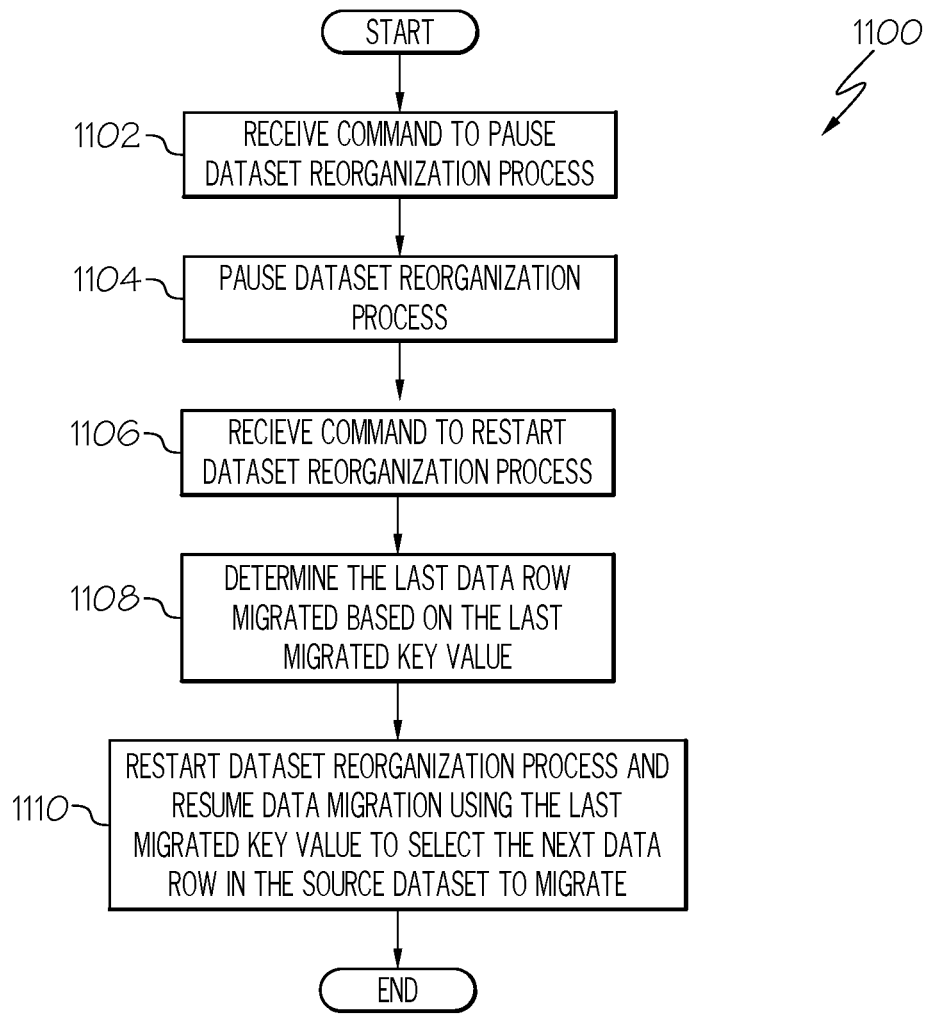
FIG. 11 is a simplified flowchart related to pausing a migration process in the communication system according to at least one embodiment.

FIG. 11 is a simplified flowchart 1100 illustrating some operations that may be performed by an I/O gateway (e.g., 234) during a dataset reorganization process according to embodiments described herein. Flowchart 1100 relates to handling requests from an authorized user (e.g., DBA) or authorized process to pause the dataset reorganization process. In one example scenario, a very large dataset may take several hours to complete. If a decision is made that another system event (e.g., unscheduled maintenance) must take priority over the dataset reorganization process, then the DBA or other authorized person may issue a command to pause the dataset reorganization process. This may be preferable to allowing the process to crash and then initiating the restart/recovery process using the log file (e.g., 233) once system processing is resumed.

In flowchart 1100, at 1102, the I/O gateway receives a command to pause the dataset reorganization process. In at least some embodiments, the database manager sends this command to the I/O gateway after receiving a command to pause the process from an authorized user or authorized process. In one example scenario, a command to pause the process may be received in order to allow an emergency action to proceed (e.g., stopping and restarting the system). In another example scenario, a DBA may pause the migration process to lessen the load on the database region while another critical process (e.g., billing) completes.

At 1104, the I/O gateway pauses the dataset reorganization process. For example, the I/O gateway stops migrating data rows. The I/O gateway may still process user data requests using the data rows in the source and target datasets. At this point, the DBA (or other system manager) may decide to take the system down and perform the action that triggered the need to pause the dataset reorganization process.

At 1106, once a determination is made to resume system processing (e.g., the unscheduled maintenance is completed), a command is received to restart the dataset reorganization process. For example, the database manager (e.g., 232) may send the command to restart the dataset reorganization process based on the completion of the system event (e.g., maintenance utility completes) or based on a command from the authorized user or process to restart the dataset reorganization process.

At 1108, the I/O gateway identifies a location in the source dataset where data migration is to resume. In one embodiment, the I/O gateway may retrieve the last migrated key value from the control block of the target dataset and/or the source dataset. The last migrated key value indicates the last data row in the native sequence of all data rows in the source dataset that was successfully migrated. The I/O gateway may then select the next data row from the source dataset based on the next key value in the native sequence after the last migrated key value. The I/O gateway may resume migration using this selected next data row.

The flowcharts and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed sequentially, substantially concurrently, or in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

As used herein, unless expressly stated to the contrary, use of the phrase 'at least one of' refers to any combination of the named elements, conditions, or activities. For example, 'at least one of X, Y, and Z' is intended to mean any of the following: 1) at least one X, but not Y and not Z; 2) at least one Y, but not X and not Z; 3) at least one Z, but not X and not Y; 4) at least one X and at least one Y, but not Z; 5) at least one X and at least one Z, but not Y; 6) at least one Y and at least one Z, but not X; or 7) at least one X, at least one Y, and at least one Z. Also, references in the specification to "one embodiment," "an embodiment," "some embodiments," etc., indicate that the embodiment(s) described may include a particular feature, structure, or characteristic, but every embodiment may or may not necessarily include that particular feature, structure, or characteristic. Moreover, such phrases are not necessarily referring to the same embodiment. Additionally, unless expressly stated to the contrary, the terms 'first', 'second', 'third', etc., are intended to distinguish the particular noun (e.g., element, condition, module, activity, operation, claim element, etc.) they modify, but are not intended to indicate any type of order, rank, importance, temporal sequence, or hierarchy of the modified noun. For example, 'first X' and 'second X' are intended to designate two separate X elements, that are not necessarily limited by any order, rank, importance, temporal sequence, or hierarchy of the two elements.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method comprising:
    creating a temporary first gateway for handling data migration, user requests, and utility process requests;
    initiating, by the temporary first gateway, a first migration of data rows in a source dataset in a first source storage device to a target dataset in a first target storage device, the first migration to be performed according to a native sequence of the data rows, wherein a block size defined for the target dataset is equal to a block size defined for the source dataset;
    during the first migration, receiving, by the temporary first gateway, a first user request for access to a first data row in the source dataset;
    determining, by the temporary first gateway, that the first data row was migrated to a first target block in the target dataset;
    responding, by the temporary first gateway, to the first user request using the first data row in the first target block;
    during the first migration,
        receiving a request for a utility process that requires access to data in the source dataset;
        determining that the data required for the utility process is in a migration process of the first migration; and
        running, by the temporary first gateway, the utility process and providing integration of the utility process with the migration process;
    creating a temporary second gateway to initiate a second migration; and subsequent to completing the first migration, removing the temporary first gateway,
wherein the temporary first gateway performs the first migration, the user requests, and the utility process, and
wherein the temporary second gateway runs at least partially concurrently with the temporary first gateway.

2. The method of claim 1, further comprising:
receiving a second user request for access to a second data row in the source dataset;
temporarily blocking the second user request based on determining that the second data row is currently selected for migrating; and
responding to the second user request after the second data row is migrated from the source dataset.

3. The method claim 1, further comprising:
selecting each data row from the source dataset to be migrated to the target dataset based on a native sequence of the data row in the source dataset.

4. The method claim 1, further comprising:
updating a last migrated key value upon each occurrence of a data row that is migrated from the source dataset to the target dataset.

5. The method claim 4, further comprising:
selecting the first data row to be migrated based on a current value of the last migrated key value and a key value of the first data row.

6. The method of claim 1, further comprising:
storing information in a log file, the information related to the data rows that are migrated from the source dataset to the target dataset.

7. The method of claim 1, further comprising:
during the first migration, receiving a third user request to access a third data row in the source dataset;
determining that the third data row has not been migrated to the target dataset;
determining that the third data row is in a source block in the source dataset;
loading the source block from the source dataset into a third buffer in memory; and
responding to the third user request using the third data row in the source block in the third buffer in memory.

8. The method of claim 1,
wherein a database manager executing on a database system creates the temporary first gateway to initiate the first migration, wherein the temporary first gateway receives the user requests for access to the source dataset.

9. The method of claim 8, further comprising:
after removing the temporary first gateway, establishing a connection from the database manager to the target dataset.

10. The method of claim 8,
wherein the database manager executing on the database system creates the temporary second gateway to initiate a second migration of data rows in a source dataset in a second source storage device to a target dataset in a second target storage device, and
wherein the temporary second gateway receives user requests for access to the source dataset in the second source storage device.

11. The method of claim 10, wherein a capacity of the target dataset in the second target storage device is greater than a capacity of the source dataset in the second source storage device.

12. The method of claim 10, wherein a capacity of the target dataset in the second target storage device is less than a capacity of the source dataset in the second source storage device.

13. A non-transitory computer readable medium comprising program code that is executable by a computer system to perform operations comprising:
creating a temporary first gateway for handling data migration, user requests, and utility process requests;
initiating, by the temporary first gateway, a migration of data rows in a source dataset in a source storage device to a target dataset in a target storage device, the migration to be performed according to a native sequence of the data rows, wherein a block size defined for the target dataset is equal to a block size defined for the source dataset;
during the migration, receiving, by the temporary first gateway, a user request to modify a first data row in the source dataset;
determining, by the temporary first gateway, that the first data row was migrated to the target dataset;
identifying the first data row in a first target block of the target dataset;
modifying, by the temporary first gateway, the first data row in the first target block of the target dataset based on the user request to modify the first data rows;
during the migration,
receiving a request for a utility process that requires access to data in the source dataset;
determining that the data required for the utility process is in a migration process of the migration; and
running, by the temporary first gateway, the utility process;
creating a temporary second gateway to initiate a second migration; and
subsequent to completing the migration, removing the temporary first gateway,
wherein the temporary first gateway is configured to perform the migration, the user requests, and the utility process, and
wherein the temporary second gateway is configured to run at least partially concurrently with the temporary first gateway.

14. The non-transitory computer readable medium of claim 13, wherein the program code is executable by the computer system to perform further operations comprising:
updating a last migrated key value upon each occurrence of a data row being migrated from the source dataset to the target dataset; and
selecting the first data row to be migrated based on a current value of the last migrated key value and a key value of the first data row.

15. The non-transitory computer readable medium of claim 13, wherein the program code is executable by the computer system to perform further operations comprising:
receiving a user request to add a second data row to the source dataset;
adding the second data row to an active target block of the target dataset;
selecting a next data row in the source dataset to be migrated to the target dataset; and
migrating the next data row from the source dataset to the active target block of the target dataset.

16. The non-transitory computer readable medium of claim 13, wherein a capacity of the target dataset is greater than or less than a capacity of the source dataset.

17. An apparatus comprising:
a processor;
a memory coupled to the processor; and
a database manager including instructions that are executable by the processor to create a temporary first gateway that, when executed, causes the processor to:
  initiate a first migration of data rows in a source dataset of a first source storage device to a target dataset in a first target storage device, the first migration to be performed according to a native sequence of the data rows, wherein a block size defined for the target dataset is equal to a block size defined for the source dataset;
  during the first migration, receive a first user request for access to a data row in a source block of the source dataset;
  determine that the data row was not migrated to the target dataset;
  respond to the first user request using the data row in the source block; and
  during the first migration,
    receive a request for a utility process that requires access to data in the source dataset;
    determine that the data required for the utility process is in a migration process of the first migration; and
    run the utility process and provide integration of the utility process with the migration process,
wherein the temporary first gateway, when executed, causes performing the first migration, user requests, and the utility process,
wherein the instructions are executable by the processor to remove the temporary first gateway, subsequent to completing the first migration,
wherein the instructions are executable by the processor to create a temporary second gateway to initiate a second migration, and
wherein the temporary second gateway is configured to run at least partially concurrently with the temporary first gateway.

18. The apparatus of claim 17, wherein the temporary first gateway, when executed, causes the processor to further:
  subsequent to loading the source block into the memory in response to the first user request, receive a second user request to modify the data row in the source block;
  determine that the data row was migrated to the target dataset;
  identify a target block of the target dataset containing the data row; and
  modify the data row in the target block of the target dataset based on the second user request to modify the data row.

19. The apparatus of claim 17, wherein the instructions are executable by the processor to:
  create the temporary second gateway to reorganize a source dataset in a second source storage device into a second native sequence, wherein the temporary second gateway, when executed, causes the processor to:
  initiate a second migration of data rows in the source dataset in the second source storage device to a target dataset in a second target storage device.

20. The apparatus of claim 19, wherein a capacity of the target dataset in the second target storage device is equal to a capacity of the source dataset in the second source storage device.

* * * * *